United States Patent
Xu et al.

(10) Patent No.: US 11,616,932 B1
(45) Date of Patent: Mar. 28, 2023

(54) CAR SECURITY CAMERA TRIGGERING MECHANISM

(71) Applicant: Ambarella International LP, Santa Clara, CA (US)

(72) Inventors: Ruian Xu, San Jose, CA (US); Udit Budhia, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 99 days.

(21) Appl. No.: 17/122,342

(22) Filed: Dec. 15, 2020

(51) Int. Cl.
| | |
|---|---|
| H04N 7/18 | (2006.01) |
| H04N 5/232 | (2006.01) |
| B60R 11/04 | (2006.01) |
| H04W 4/80 | (2018.01) |
| H04W 84/18 | (2009.01) |
| G06V 40/10 | (2022.01) |

(52) U.S. Cl.
CPC .............. H04N 7/185 (2013.01); B60R 11/04 (2013.01); G06V 40/10 (2022.01); H04N 5/23206 (2013.01); H04N 5/232411 (2018.08); H04N 7/188 (2013.01); H04W 4/80 (2018.02); H04W 84/18 (2013.01)

(58) Field of Classification Search
CPC .. H04N 5/232411; H04N 7/185; H04N 7/188; B60R 2300/8073; B60R 2300/404; B60R 2300/406; G08B 13/19647; G08B 13/19669; G08B 13/19695; G08B 13/19697; G08B 13/19671; G08B 13/19673; G08B 13/19676

See application file for complete search history.

(56) References Cited

U.S. PATENT DOCUMENTS

| | | | | |
|---|---|---|---|---|
| 9,619,718 | B2 * | 4/2017 | Michmerhuizen | H04L 67/12 |
| 9,749,528 | B1 * | 8/2017 | Fink | G06F 1/3206 |
| 9,902,355 | B2 * | 2/2018 | Baker | B60R 11/04 |
| 9,906,722 | B1 * | 2/2018 | Gigot | H04N 5/772 |
| 10,115,029 | B1 * | 10/2018 | Day | G06V 20/59 |
| 10,421,436 | B2 * | 9/2019 | Gage | G06V 20/56 |
| 10,647,300 | B2 * | 5/2020 | Shirazi | G08B 13/00 |

(Continued)

FOREIGN PATENT DOCUMENTS

| | | | | | |
|---|---|---|---|---|---|
| CN | 104331003 | A | * | 2/2015 | ......... G05B 19/4188 |
| CN | 106004669 | A | * | 10/2016 | |

(Continued)

*Primary Examiner* — John Villecco
(74) *Attorney, Agent, or Firm* — Christopher P. Maiorana, PC

(57) ABSTRACT

An apparatus including a capture device and one or more sensors. The capture device may be configured to operate in a standby mode of operation until a wakeup signal is received and operate in video capture mode of operation in response to the wakeup signal. The sensors may each be configured to detect a trigger condition and communicate the wakeup signal in response to detecting the trigger condition. The capture device may be configured to consume a first amount of power in the standby mode of operation and a second amount of power in the video capture mode of operation. The first amount of power may be less than the second amount of power. The capture device may be configured to generate pixel data in the video capture mode of operation. Each of the sensors may be remotely located on a vehicle with respect to the capture device.

19 Claims, 11 Drawing Sheets

(56) References Cited

U.S. PATENT DOCUMENTS

| | | | | |
|---|---|---|---|---|
| 10,807,563 B1* | 10/2020 | Hwang | ................ | B60R 25/102 |
| 11,076,099 B1* | 7/2021 | Xu | ..................... | H04N 5/23258 |
| 11,104,302 B2* | 8/2021 | Björkengren | .... | G08B 13/19695 |
| 11,155,237 B2* | 10/2021 | Leedy | .................. | B60R 25/305 |
| 11,281,286 B1* | 3/2022 | Kajuluri | ................ | G06F 1/3296 |
| 2006/0092278 A1* | 5/2006 | Kondo | ................ | B60R 25/102 |
| | | | | 348/148 |
| 2007/0182526 A1* | 8/2007 | Horii | .................... | B60R 25/305 |
| | | | | 340/541 |
| 2009/0143967 A1* | 6/2009 | Lee | .......................... | B60R 1/00 |
| | | | | 701/119 |
| 2015/0169968 A1* | 6/2015 | Michmerhuizen | ......................... | |
| | | | | G08B 13/19647 |
| | | | | 348/148 |
| 2016/0176342 A1* | 6/2016 | Yang | ........................ | B60R 1/00 |
| | | | | 348/148 |
| 2018/0072269 A1* | 3/2018 | Tong | ..................... | B60R 25/305 |
| 2018/0167551 A1* | 6/2018 | Koravadi | ........... | B62D 15/0255 |
| 2020/0108796 A1* | 4/2020 | Björkengren | .... | G08B 13/19695 |
| 2020/0262395 A1* | 8/2020 | Avila | .................. | B60R 25/1004 |
| 2020/0396413 A1* | 12/2020 | Tsubouchi | ................ | G06T 7/70 |
| 2021/0097315 A1* | 4/2021 | Carruthers | .............. | H04W 4/40 |
| 2021/0229629 A1* | 7/2021 | Ghannam | ............. | B60R 25/305 |
| 2021/0309183 A1* | 10/2021 | Bielby | .................. | B60R 25/305 |

FOREIGN PATENT DOCUMENTS

| | | | | | |
|---|---|---|---|---|---|
| CN | 106043298 A | * | 10/2016 | | |
| CN | 106114422 A | * | 11/2016 | | |
| CN | 109624901 A | * | 4/2019 | | |
| CN | 111836005 A | * | 10/2020 | | |
| DE | 29615727 U1 | * | 11/1996 | ............. | G01P 13/00 |
| KR | 20110046219 A | * | 5/2011 | | |
| KR | 20110101831 A | * | 9/2011 | | |
| KR | 20130113838 A | * | 10/2013 | | |
| KR | 101540102 B1 | * | 7/2015 | | |
| KR | 1752675 B1 | * | 6/2017 | ............. | B60R 1/081 |
| WO | WO-2020025614 A1 | * | 2/2020 | | |

* cited by examiner

CAR SECURITY CAMERA TRIGGERING MECHANISM

FIELD OF THE INVENTION

The invention relates to video capture generally and, more particularly, to a method and/or apparatus for implementing a car security camera triggering mechanism.

BACKGROUND

Cameras installed in and on vehicles (i.e., vehicle cameras or in-car cameras) are becoming more common. Vehicle cameras can be used to acquire data for safety, autonomous driving and/or driver assistance features. Vehicle cameras can be used to record evidence (i.e., dashcams for insurance purposes). Vehicle cameras can be used for vehicle security (i.e., a surveillance camera while the vehicle is unoccupied). Vehicle cameras are typically powered by the power system of the ego vehicle.

In-car security cameras are typically mounted behind the windshield and connected to the OBD-II port of the ego vehicle. Security footage is captured to detect impacts (i.e., another driver hitting the car in a parking lot or causing a dent with a car door), attempts to opening the doors, vandalism, etc. For power saving reasons (i.e., to avoid depleting the car battery), vehicle cameras operate in a low-powered state while waiting for activation when the ego vehicle is parked. The vehicle camera operates in the low-powered state (i.e., not recording video) until a triggering event is detected. The triggering event activates the cameras for video recording and other actions (i.e., such as sending an alert signal to the owner, or triggering connected home security cameras to start recording).

Since vehicle cameras do not record until activated, there is often an issue that when the triggering event is detected, by the time the vehicle camera(s) start recording, the video footage captured misses the context and/or begins recording too late to respond with a preventative measure. For example, the opportunity to warn the person trying to break-in and/or to fend off the theft to avoid damages (i.e., being broken into) may be missed because the vehicle camera did not get activated until after physical contact was made with the ego vehicle. In another example, if the owner of a parked car opens the door and hits the ego vehicle while exiting, the video footage captured would not be detected until the impact, and the opportunity to capture the license plate of the other vehicle while it is pulling up might be missed. Unlike battery powered security cameras, where the camera can use passive infrared sensors to trigger the activation of the camera when a person is still far away, the vehicle security camera is mounted behind the wind-shield, and cannot be triggered by such a mechanism.

It would be desirable to implement a car security camera triggering mechanism.

SUMMARY

The invention concerns an apparatus comprising a capture device and one or more sensors. The capture device may be configured to operate in a standby mode of operation until a wakeup signal is received and operate in video capture mode of operation in response to the wakeup signal. The one or more sensors may each be configured to detect a trigger condition and communicate the wakeup signal in response to detecting the trigger condition. The capture device may be configured to consume a first amount of power in the standby mode of operation and a second amount of power in the video capture mode of operation. The first amount of power may be less than the second amount of power. The capture device may be configured to generate pixel data in the video capture mode of operation. Each of the sensors may be remotely located on a vehicle with respect to the capture device.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
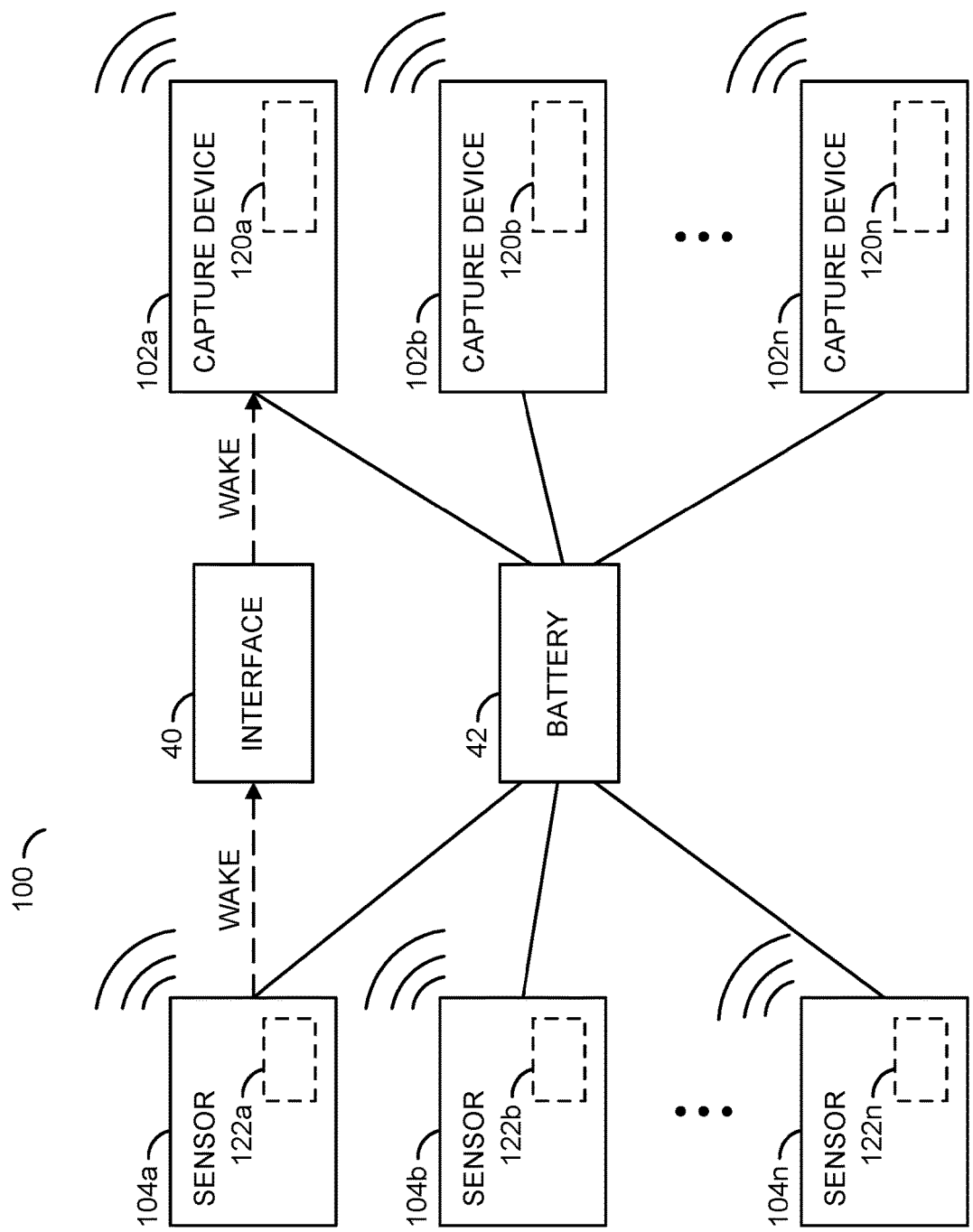
FIG. 1 is a diagram illustrating a block diagram of an embodiment of the present invention.

Embodiments of the present invention include providing a car security camera triggering mechanism that may (i) implement low-powered sensors, (ii) perform security camera operations, (iii) prevent theft and/or damage to a vehicle, (iv) activate cameras from a sleep mode, (v) ensure cameras are active before an object reaches the vehicle, (vi) trigger cameras using a wireless signal generated by a sensor, (vii) trigger cameras by communicating over an OBD-II port of a vehicle (viii) implements exterior sensors to activate an interior camera and/or (ix) be implemented as one or more integrated circuits.

Embodiments of the present invention may be configured to implement a mechanism to use low-power sensors to trigger security camera operations (e.g., video recording, video streaming, computer vision, etc.). One or more of the sensors may be mounted on an exterior of an ego vehicle. The security camera (e.g., a capture device) may be implemented within a cabin of the ego vehicle. Activating the capture devices in response to a trigger condition detected by the sensor(s) may ensure that the capture devices may be activated to capture video data that may provide a context for the video recording.

Capturing the context for the video recording may enable a reaction to be performed that may prevent damage to and/or theft of the ego vehicle. In one example, if a person is attempting to vandalize the ego vehicle, capturing video data after the damage has occurred may be of limited value to an owner of the ego vehicle (e.g., the damage has already been done). If the sensors are able to detect the person attempting to vandalize the ego vehicle, the capture device may be activated and the person may be recorded before the vandalism occurred. A reaction may be performed (e.g., sounding a car alarm, providing a notification to the vehicle owner, providing a notification to authorities such as the police, informing the person that they have been recorded, etc.).

Generally, the capture device may be located within the ego vehicle. For example, the capture device may be located in a cabin of the ego vehicle and capture the environment outside of the ego vehicle through the windshield. For example, if the capture device comprises a passive infrared sensor (PIR), the windshield may prevent a detection of a person approaching the ego vehicle using the PIR sensor. The sensors may be mounted on the exterior of the ego vehicle. Externally mounted sensors may enable detections of triggering conditions that may not be capable when behind a windshield (e.g., detecting motion using PIR sensors).

In some embodiments, the capture device may be an after-market component for the ego vehicle. For example, the external sensors may not have a direct connection to the capture device via the ego vehicle. The external sensors may integrate low powered communications. The low powered communications may be configured to communicate with the security camera to enable activation of the security camera (e.g., activation ahead of time of a potential threat and/or incident). Activation ahead of time may enable the capture device to initiate a reaction in order to mitigate a potential issue (e.g., damage from happening).

Referring to FIG. 1, a diagram illustrating a block diagram of an embodiment of the present invention is shown. An apparatus (or device or system) is shown. The apparatus 100 may be implemented in, or as part of, a vehicle (e.g., an ego vehicle, not shown). The apparatus 100 may be configured to enable the activation of video recording and/or other video-related operations to enable video capture and/or analysis of a context of an event.

The apparatus 100 may comprise blocks (or circuits) 102a-102n and/or blocks (or circuits) 104a-104n. The circuits 102a-102n may implement capture devices. The circuits 104a-104n may implement sensors. The apparatus 100 may comprise other components (not shown). The number, type and/or arrangement of the components of the apparatus 100 may be varied according to the design criteria of a particular implementation.

An interface 40 and a battery 42 are shown. The interface 40 and the battery 42 may be components of the ego vehicle. The interface 40 may be configured to enable various systems, sub-systems, and/or vehicle sensors connected to the ego vehicle to communicate and/or report a status to each other. In one example, the interface 40 may comprise an OBD-II communications protocol. In another example, the interface 40 may comprise a CAN bus of a vehicle. The battery 42 may be configured to provide power to various systems, sub-systems and/or vehicle sensors connected to the ego vehicle. In one example, the battery 42 may comprise a lead-acid battery implemented by the ego vehicle powered by an internal combustion engine (e.g., ICE). In another example, the battery 42 may comprise a lithium ion battery that may provide an energy storage system for an electric and/or hybrid implementation of the ego vehicle. The type and/or technology implemented by the interface 40 and/or the battery 42 may be varied according to the design criteria of a particular implementation.

The interface 40 may enable one or more of the sensors 104a-104n to communicate with one or more of the capture devices 102a-102n. Similarly, the capture devices 102a-102n may communicate with the sensors 104a-104n using the interface 40. The battery 42 may be configured to provide a power supply and/or energy source for the capture devices 102a-102n and/or the sensors 104a-104n.

The capture devices 102a-102n may each comprise a respective one of blocks (or circuits) 120a-120n. The circuits 120a-120n may implement communication devices. In an example, the communication devices 120a-120n may be configured to implement a wireless communications protocol. The capture devices 102a-102n may comprise other components (not shown). The number, type and/or arrangement of the components of the capture devices 102a-102n may be varied according to the design criteria of a particular implementation. Details of the capture devices 102a-102n may be described in association with FIGS. 2-3.

The capture devices 102a-102n may be configured to operate in a standby mode of operation. The capture devices 102a-102n may operate in the standby mode of operation until a signal (e.g., WAKE) is received. The signal WAKE may be a wakeup signal. In response to the wakeup signal WAKE, the capture devices 102a-102n may operate in a video capture mode of operation. The standby mode of operation and the video capture mode of operation may each consume an amount of power from the battery 42. The standby mode of operation of the capture devices 102a-102n may consume less power than the video capture mode of operation of the capture devices 102a-102n.

To reduce an amount of power consumption from the battery 42, the capture devices 102a-102n may operate in the standby mode of operation. After activation in response to the wakeup signal WAKE, the capture devices 102a-102n may operate in the video capture mode of operation (e.g., for a particular amount of time). In the video capture mode of operation, the capture devices 102a-102n may be configured to generate pixel data. The pixel data may be used to generate video frames. When operating in the video capture mode of operation, the capture devices 102a-102n may be further configured to encode video, establish connectivity to remote devices (e.g., using LTE/Wi-Fi communication protocols implemented by the communication devices 120a-120n), stream captured video to remote devices, perform computer vision operations (e.g., determine if a person is walking towards the ego vehicle, detect suspicious behavior, detect objects that may collide with the ego vehicle, etc.), etc. After the particular amount of time, the capture devices 102a-102n may return to the standby mode of operation.

The sensors 104a-104n may each comprise a respective one of blocks (or circuits) 122a-122n. The circuits 122a-122n may implement communication devices. In an example, the communication devices 122a-122n may be configured to implement a wireless communications protocol. The sensors 104a-104n may comprise other components (not shown). The number, type and/or arrangement of the components of the sensors 104a-104n may be varied according to the design criteria of a particular implementation.

Each of the sensors 104a-104n may be configured to detect a trigger condition. The particular trigger condition detected by each of the sensors 104a-104n may depend on the type and/or functionality of the sensors 104a-104n. In response to detecting the trigger condition, the sensors 104a-104n may generate the wakeup signal WAKE. The wakeup signal WAKE may be communicated to one or more of the capture devices 102a-102n.

In some embodiments, the sensors 104a-104n may each be implemented as the same type of sensor. In some embodiments, the sensors 104a-104n may comprise a combination of different sensor types. In some embodiments, each of the sensors 104a-104n may implement a different type of sensor. In one example, one or more of the sensors 104a-104n may implement a PIR sensor. For example, the PIR sensor may detect motion and the trigger condition may comprise a threshold amount of motion detected. In another example, one or more of the sensors 104a-104n may implement an ultra-sound sensor. In yet another example, one or more of the sensors 104a-104n may implement a radar sensor. In still another example, one or more sensors 104a-104n may implement a lidar sensor. For example, the ultra-sound sensor, the radar sensor and/or the lidar sensor may be configured to detect a distance to an object, and the trigger condition may comprise a threshold amount of distance between the object and the ego vehicle. In another example, one or more of the sensors 104a-104n may implement a g-sensor (e.g., a smart motion sensor). For example, the g-sensor may detect motion of the ego vehicle and the trigger condition may comprise a threshold amount of motion detected. The number, type and/or arrangement of the sensors 104a-104n and/or the thresholds for the particular trigger conditions for the sensors 104a-104n may be varied according to the design criteria of a particular implementation.

The sensors 104a-104n may be stand-alone components (e.g., not necessarily a component of the ego vehicle and/or not necessarily a component of any of the capture devices 102a-102n). The sensors 104a-104n may be low-powered sensors. For example, the sensors 104a-104n may consume less power than the capture devices 102a-102n (e.g., while operating in the video capture mode of operation). The power draw of the sensors 104a-104n may be small enough to enable the sensors 104a-104n to operate without causing a significant drain on the battery 42 (e.g., the operation of the sensors 104a-104n may not render the ego vehicle non-functional). In some embodiments, the battery 42 may prevent power being presented to the sensors 104a-104n and/or the capture devices 102a-102n when the remaining charge of the battery 42 drops below a threshold amount for ensuring functionality of the ego vehicle.

In some embodiments, the sensors 104a-104n may be configured to communicate the wakeup signal WAKE wirelessly. The communication devices 122a-122n may be configured to wirelessly transmit the wakeup signal WAKE to the communication devices 120a-120n of the capture devices 102a-102n. In some embodiments, the communication devices 120a-120n and/or the communication devices 122a-122n may communicate via low power RF communications protocols. In one example, the communication protocol implemented by the communication devices 120a-120n and/or the communication devices 122a-122n may be a Bluetooth protocol (e.g., BLE). In another example, the communication protocol implemented by the communication devices 120a-120n and/or the communication devices 122a-122n may be a sub-1 GHz communication protocol. In yet another example, the communication protocol implemented by the communication devices 120a-120n and/or the communication devices 122a-122n may be a ZigBee communication protocol. The type of communication implemented by the communication devices 120a-120n and/or the communication devices 122a-122n may be varied according to the design criteria of a particular implementation.

In some embodiments, in the standby mode of operation of the capture devices 102a-102n, the communication devices 120a-120n may be operational. Enabling the communication devices 120a-120n in the standby mode of operation may ensure that the wakeup signal WAKE is received by the capture devices 102a-102n. In some embodiments, the sensors 104a-104n may be configured to wirelessly communicate the wakeup signal WAKE to the interface 40 of the ego vehicle and the interface 40 may provide a wired connection to the capture devices 102a-102n (e.g., enabling the standby mode of operation to further reduce power by disabling the communication devices 120a-120n). In some embodiments, the sensors 104a-104n may communicate the wakeup signal WAKE to the interface 40 via a wired connection and the interface 40 may present the wakeup signal WAKE to the capture devices 102a-102n via a wired connection.

When an event has not yet been detected, the capture devices 102a-102n may operate in the standby mode of operation (e.g., video data may not be recorded). Operating in the standby mode of operation may prevent the capture devices 102a-102n from depleting the battery 42. When the sensors 104a-104n detect an event (e.g., the trigger condition is detected such as a person approaching the ego vehicle from the front or rear), the sensors 104a-104n may be triggered first to generate the wakeup signal WAKE. The wakeup signal WAKE may be configured to activate the capture devices 102a-102n (e.g., change the mode of operation from the standby mode of operation to the video capture mode of operation).

In an example, where the event is a person approaching the ego vehicle, the sensors 104a-104n may be configured to detect the person before the person reaches the ego vehicle. The person approaching the ego vehicle may be the trigger condition that causes one or more of the sensors 104a-104n to send the wakeup signal WAKE to the capture devices 102a-102n. Activating the capture devices 102a-102n in response to the trigger conditions detected by the sensors 104a-104n may provide sufficient time for the capture devices 102a-102n to be activated (e.g., establish an LTE connection, record and/or encode video frames, perform computer vision operations, etc.) before the person reaches the ego vehicle. For example, in response to the computer vision operations detecting suspicious behavior of the person, the capture devices 102a-102n may generate a notification (e.g., communicate a message to a remote device such as a smartphone of the owner of the ego vehicle), upload video (e.g., as soon as the interface 40 reports any activity such as an attempt to open the door), activate sirens (e.g., a car alarm, a pre-recorded message, etc.) to prevent a break-in attempt, etc.

By activating the capture devices 102a-102n before there is physical contact with the ego vehicle based on detections made by the sensors 104a-104n, video recorded may provide context for the event. The context for the event may provide an advanced warning in order to prevent property damage and/or take appropriate actions after an incident has occurred (e.g., provide insurance companies evidence, provide information for a police report, etc.).

In some embodiments, the sensors 104a-104n may comprise pre-installed sensors of the ego vehicle (e.g., sensors that come with the ego vehicle). The pre-installed sensors 104a-104n may be operational while the ego vehicle is parked. The output from the sensors 104a-104n (e.g., various detections performed) may be directed to the interface 40 (e.g., the OBD-II port). The interface 40 may forward the detections made to the capture devices 102a-102n to trigger the cameras 102a-102n (e.g., an activation via the OBD-II port).

Generally, the sensors 104a-104n may be implemented on the exterior of the ego vehicle. The sensors 104a-104n may be remotely located with respect to the capture devices 102a-102n. In one example, one capture device (e.g., 102i) may be implemented within a cabin of the ego vehicle. The capture device 102i within the cabin may capture video through the windshield (or other windows) of the ego vehicle, while the sensors 104a-104n may perform detections from the outside of the ego vehicle. While multiple sensors 104a-104n and multiple capture devices 102a-102n are shown, the number of capture devices 102a-102n and/or the number of sensors 104a-104n implemented may be varied according to the design criteria of a particular implementation.

Figure 2:
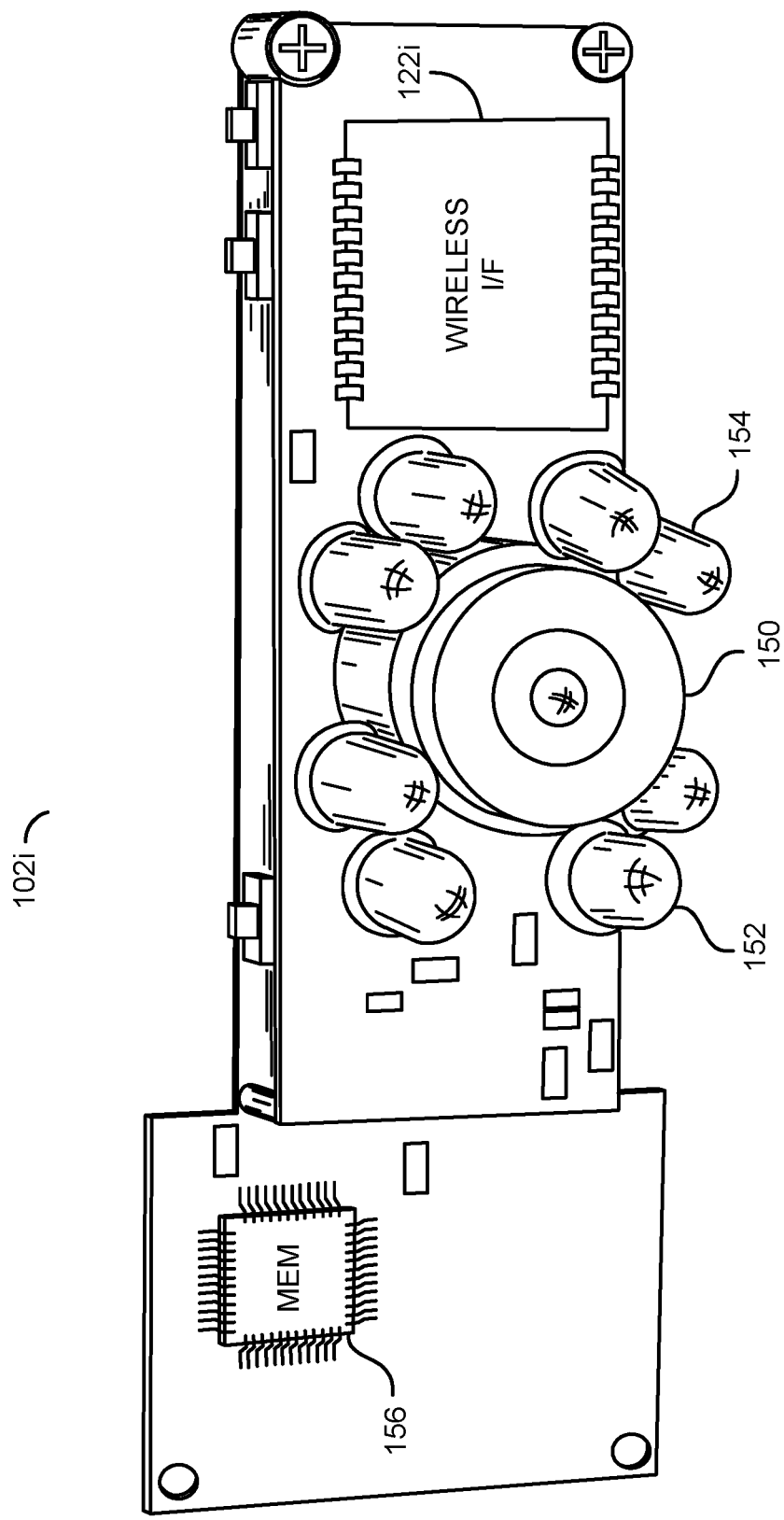
FIG. 2 is a diagram illustrating an example embodiment of a capture device.

Referring to FIG. 2 a diagram illustrating an example embodiment of a capture device is shown. The capture device 102i is shown. The capture device 102i may be a representative example of any one of the capture devices 102a-102n. In various embodiments, the camera 102i may comprise one or more circuit boards. In embodiments implementing more than one circuit board, the printed circuit boards may be mounted together. In an example, a first printed circuit board may include a lens 150, a number of infrared (IR) LEDs 152, one or more visible (white) light LEDs 154, and the communication device 122i. A second printed circuit board may comprise a memory circuit (or chip) 156 as well as a processor/SoC and an image sensor (both obscured by the first printed circuit board). In one example, the communication device 122i may comprise a pre-certified wireless/cellular protocol module.

Figure 3:
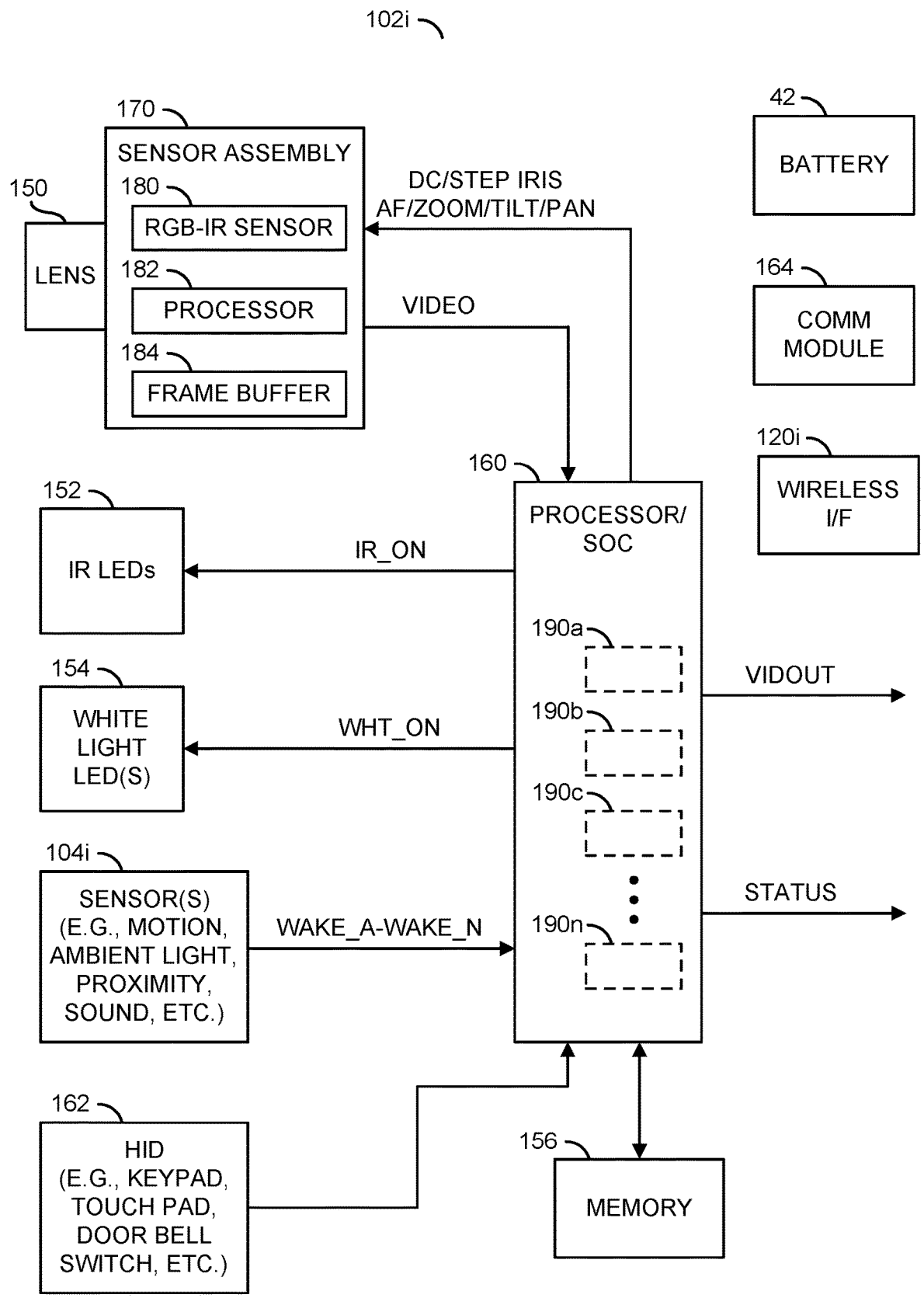
FIG. 3 is a diagram illustrating a block diagram illustrating an example embodiment of the capture device.

Referring to FIG. 3, a diagram illustrating a block diagram illustrating an example embodiment of the capture device is shown. Components and/or inputs/outputs of the capture device 102i are shown. The capture device 102i is shown as a representative example. The description of the capture device 102i may be applicable to any one or more of the capture devices 102a-102n.

In an example shown, the capture device 102i may comprise the wireless interface 120 (e.g., the communication device 120i), the IR LEDs 152, the white light LEDs 154, the memory 156, block (or circuit) 160, a block (or circuit) 164 and/or a block (or circuit) 170. The capture device 102i may be connected to the battery 42, the sensor 104i (e.g., a representative example of one or more of the sensors 104a-104n) and/or a block (or circuit) 162. The circuit 160 may be implemented as a processor or System on Chip (SoC). The circuit 162 may be implemented as a human interface device. The circuit 164 may be implemented as a communications module. The circuit 170 may be implemented as a camera device (or lens assembly or sensor assembly). The lens 150 may be a component of the sensor assembly 170. The capture device 102i may comprise other components (not shown). The number, type and/or arrangement of the components of the capture devices 102a-102n may be varied according to the design criteria of a particular implementation.

In some embodiments, the camera 102i may comprise the processor/SoC 160, the memory 156, the lens 150, the IR LEDs 152, the visible light LEDs 154, the sensors 104i, the communication module 164, and the wireless interface 120. In another example, the camera 102i may comprise the sensor assembly 170, the lens 150, the IR LEDs 152, and the visible light LEDs 154, and the SoC 160, the memory 156, the communication module 164, the wireless interface 120, and the battery 42 may be components of a separate device. The implementation of the camera 102i may be varied according to the design criteria of a particular implementation.

The lens 150 may be attached to the sensor assembly 170. In an example, the sensor assembly 170 may comprise a block (or circuit) 180, a block (or circuit) 182, and a block (or circuit) 184. In an example, the circuit 180 may be an image sensor (e.g., monochrome, RGB, RGB-IR, etc.). The circuit 182 may be a processor and/or logic. The circuit 184 may be a memory circuit (e.g., a frame buffer). The sensor assembly 170 may comprise other components (not shown). The number, type and/or arrangement of the components of the sensor assembly 170 may be varied according to the design criteria of a particular implementation.

The sensor assembly 170 may be configured to capture video image data and/or pixel data (e.g., light collected and focused by the lens 150). The sensor assembly 170 may capture data received through the lens 150 to enable the sensor assembly 170 and/or the SoC 160 to generate a video bitstream (e.g., a sequence of video frames). In various embodiments, the lens 150 may be implemented as a fixed focus lens. A fixed focus lens generally facilitates smaller size and low power. In an example, a fixed focus lens may be used in battery powered camera applications. In some embodiments, the lens 150 may be directed, tilted, panned, zoomed and/or rotated to capture the environment surrounding the capture device 102i (e.g., capture data from the field of view). In an example, professional-class models of cameras may be implemented with an active lens system for enhanced functionality, remote control, etc.

The sensors 104i may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 104i may include both onboard and remotely located sensors configured to detect motion anywhere in or near the field of view monitored by the camera 102i. In various embodiments, the detection of motion may be used as one threshold for activating the capture device 102i. The sensors 104i may be implemented as an internal component of the capture device 102i and/or as a component external to the capture device 102i (e.g., remote sensors, etc.). In an example, the sensors 104i may be implemented as a passive infrared (PIR) sensor. In another example, the sensors 104i may be implemented as a smart motion sensor. In embodiments implementing the smart motion sensor, the sensors 104i may comprise a low resolution image sensor configured to detect motion and/or run person detection).

In various embodiments, the sensors 104a-104n may generate respective signals (e.g., WAKE_A-WAKE_N). The signals WAKE_A-WAKE_N may be examples of the wakeup signal WAKE described in association with FIG. 1. The signals WAKE_A-WAKE_N may comprise a variety of data (or information) collected by the sensors 104a-104n. In an example, the signals WAKE_A-WAKE_N may comprise data collected in response to motion being detected in the monitored field of view, a remote location outside the monitored field of view, an ambient light level in the monitored field of view, and/or sounds picked up in and/or out of the monitored field of view. However, other types of data may be collected and/or generated based upon design criteria of a particular application.

The signals WAKE_A-WAKE_N may be presented to the processor/SoC 160. In an example, the sensors 104a-104n may generate (assert) the signals WAKE_A-WAKE_N when motion is detected in the field of view monitored by the respective sensors. In another example, the sensors 104a-104n may generate (assert) the signals WAKE_A-WAKE_N when triggered by audio in the field of view monitored by the capture device 102i. In still another example, the sensors 104a-104n may be configured to provide directional information with respect to motion and/or sound detected in and/or out of the field of view. The directional information may also be communicated to the processor/SoC 160 via the signals WAKE_A-WAKE_N.

The sensor assembly 170 may transform the received light into a digital data stream. In some embodiments, the sensor assembly 170 may perform an analog to digital conversion. For example, the image sensor 180 may perform a photo-electric conversion of the light received by the lens 150. The processor 182 may transform the digital data stream into pixel data, a video data stream (or bitstream), a video file, and/or a number of video frames. In an example, the sensor assembly 170 may present the video data as a digital video signal (e.g., VIDEO). In another example, the sensor assembly 170 may present the signal VIDEO as pixel data. The digital video signal may comprise the video frames (e.g., sequential digital images and/or audio).

The video data captured by the sensor assembly 170 may be represented as a signal/bitstream/data VIDEO (e.g., a digital video signal comprising pixel data). The sensor assembly 170 may present the signal VIDEO to the processor/SoC 160. The signal VIDEO may represent the pixel data and/or the video frames/video data. The signal VIDEO may be a video stream captured by the sensor assembly 170.

The image sensor 180 may receive light from the lens 150 and transform the light into digital data (e.g., the bitstream). For example, the image sensor 180 may perform a photo-electric conversion of the light from the lens 150. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (e.g., B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light. In one example, the image sensor 180 may implement a rolling shutter sensor. In another example, the image sensor 180 may implement a global shutter.

The processor/logic 182 may transform the bitstream into a human viewable content (e.g., video data that may be understandable to an average person regardless of image quality, such as the video frames). For example, the processor/logic 182 may receive pure (e.g., raw) data from the RGB-IR sensor 180 and generate (e.g., encode) video data (e.g., the bitstream) based on the raw data. The sensor assembly 170 may have the memory 184 to store the raw data and/or the processed bitstream. For example, the sensor assembly 170 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the sensor assembly 170.

The processor/SoC 160 may be configured to execute computer readable code and/or process information. In various embodiments, the computer readable code may be stored within the processor/SoC 160 (e.g., microcode, etc.) and/or in the memory 156. The processor/SoC 160 may be configured to receive input from and/or present output to the memory 156. In an example, the processor/SoC 160 may be configured to execute one or more artificial neural network models (e.g., facial recognition CNN, object detection CNN, object classification CNN, etc.) stored in the memory 156. In an example, the memory 156 may store one or more directed acyclic graphs (DAGs) and one or more sets of weights defining the one or more artificial neural network models. The processor/SoC 160 may be configured to present and/or receive other signals (not shown). The number and/or types of inputs and/or outputs of the processor/SoC 160 may be varied according to the design criteria of a particular implementation. The processor/SoC 160 may be configured for low power (e.g., battery) operation.

The processor/SoC 160 may receive the signal VIDEO and one or more of the signals WAKE_A-WAKE_N. The processor/SoC 160 may generate a video output signal (e.g., VIDOUT) based on the signal VIDEO, the signals WAKE_A-WAKE_N, and/or other input. In some embodiments, the signal VIDOUT may be generated based on analysis of the signal VIDEO and/or objects detected in the signal VIDEO. In various embodiments, the processor/SoC 160 may be configured to perform one or more of feature extraction, object detection, object tracking, and object identification. For example, the processor/SoC 160 may determine motion information by analyzing a frame from the signal VIDEO and comparing the frame to a previous frame. The comparison may be used to perform digital motion estimation. In some embodiments, the processor/SoC 160 may be configured to generate the video output signal VIDOUT comprising video data from the signal VIDEO. The video output signal VIDOUT may be presented to the memory 156, the communications module 164, and/or the wireless interface 120.

The memory 156 may store data. The memory 156 may implement various types of memory including, but not limited to, as a cache, flash memory, memory card, random access memory (RAM), dynamic RAM (DRAM) memory, etc. The type and/or size of the memory 156 may be varied according to the design criteria of a particular implementation. The data stored in the memory 156 may correspond to a video file, motion information (e.g., readings from the sensors 104a-104n), video fusion parameters, image stabilization parameters, user inputs, and/or metadata information.

The lens 150 (e.g., camera lens) may be directed to provide a view of an environment surrounding the camera 102i. The lens 150 may be aimed to capture environmental data (e.g., light). The lens 150 may be wide-angle lenses and/or fish-eye lenses (e.g., lenses capable of capturing a wide field of view). The lens 150 may be configured to capture and/or focus the light for the sensor assembly 170. Generally, the image sensor 180 is located behind the lens 150. Based on the captured light from the lens 150, the sensor assembly 170 may generate a bitstream and/or video data.

The communications module 164 may be configured to implement one or more communications protocols. For example, the communications module 164 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, Bluetooth® LE, and/or ZigBee. In some embodiments, the communications module 164 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 102i is implemented as a wireless camera, the protocol implemented by the communications module 164 may be a wireless communications protocol. The communications module 164 may be configured to remote devices (e.g., cell towers, smartphones, cloud services, etc.). The wireless interface 120i may be configured to communicate with the sensors 104a-104n. In some embodiments, the communications module 164 and the wireless interface 120i may communicate using one or more of the same communications protocols. In some embodiments, the communications module 164 and the wireless interface 120i may be the same device. The type of communications protocols implemented by the communications module 164 may be varied according to the design criteria of a particular implementation.

The communications module 164 and/or the wireless interface 120i may be configured to generate a broadcast signal as an output from the capture device 102i. The broadcast signal may send the video data VIDOUT to external devices. For example, the broadcast signal may be sent to a cloud storage service (e.g., a storage service capable of scaling on demand). In some embodiments, the communications module 164 may not transmit data until the processor/SoC 160 has performed video analytics to determine that an object is in the field of view of the capture device 102i.

In some embodiments, the communications module 164 and/or the wireless interface 120i may be configured to generate a manual control signal. The manual control signal may be generated in response to a signal from a user received by the communications module 164 and/or the wireless interface 120i. The manual control signal may be configured to activate the processor/SoC 160. The processor/SoC 160 may be activated in response to the manual control signal regardless of the power state of the capture device 102i.

In some embodiments, the camera 102i may include a battery (e.g., a power supply) configured to provide power for the various components of the capture device 102i (e.g., a power supply separate from the battery 42 of the ego vehicle). The multi-step approach to activating and/or disabling the capture device 102i based on the output of the external sensor(s) 104a-104n and/or any other power consuming features of the capture device 102i may be implemented to reduce a power consumption of the capture device 102i and extend an operational lifetime of the battery 42. The sensors 104a-104n may have a very low drain on the battery 42 (e.g., less than 10 W). In an example, the sensors 104a-104n may be configured to remain on (e.g., always active) unless disabled in response to feedback from the processor/SoC 160. The video analytics performed by the processor/SoC 160 may have a large drain on the battery 42 (e.g., greater than the sensors 104a-104n). In an example, the processor/SoC 160 may be in a low-power state (or power-down) until some trigger condition is detected by the sensors 104a-104n.

The capture device 102i may be configured to operate using various power states. For example, in the power-down state (e.g., a sleep state, a low-power state) the wireless interface 120i and/or the processor/SoC 160 may be on and other components of the capture device 102i (e.g., the sensor assembly 170, the memory 156, the communications module 164, etc.) may be off. In another example, the capture device 102i may operate in an intermediate state. In the intermediate state, the sensor assembly 170 may be on and the memory 156 and/or the communications module 164 may be off. In yet another example, the capture device 102i may operate in the video capture (or high power) state. In the video capture state, the processor/SoC 160, the sensor assembly 170, the memory 156, and/or the communications module 164 may be on. The capture device 102i may consume some power from the battery 42 in the power-down state (e.g., a relatively small and/or minimal amount of power). The capture device 102i may consume more power from the battery 42 in the video capture state. The number of power states and/or the components of the capture device 102i that are on while the capture device 102i operates in each of the power states may be varied according to the design criteria of a particular implementation.

In some embodiments, the capture device 102i (or components of the ego vehicle such as a door lock) may include a keypad, a touch pad (or screen), and/or other human interface devices (HIDs) 162. In an example, the sensors 104a-104n may be configured to determine when an object is in proximity to the HIDs 162. In an example where the capture device 102i is implemented as part of an access control application, the white light LED 154 may be turned on (e.g., in response to a signal WHT_ON generated by the processor 160) to provide illumination for identifying a person attempting access, illumination of a lock area, and/or illumination for an access touch pad.

The processor 160 may be configured to generate a signal (e.g., STATUS). The signal STATUS may be presented to the interface 40. In an example, the signal STATUS may provide an indication of which mode of operation the capture device 102i is operating in. For example, the signal STATUS may indicate to other components of the ego vehicle whether the capture device 102i is operating in the standby mode of operation and/or the video capture mode of operation.

The processor 160 is shown comprising a number of blocks (or circuits) 190a-190n. The blocks 190a-190n may implement various hardware modules implemented by the processor 160. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision (e.g., object detection, segmentation, classification, etc.), etc. Various implementations of the processor 160 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 15/931,942, filed on May 14, 2020, U.S. patent application Ser. No. 16/831,549, filed on Mar. 26, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 160 using the dedicated hardware modules 190a-190n may enable the processor 160 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weightings (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 160 to determine a likelihood that pixels of the video frames correspond to particular objects (e.g., a particular make/model/year of a vehicle, identifying a person as a particular individual, detecting a type of animal, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 160 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 160 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 150 may represent one coordinate (e.g., a location coordinate on a third axis) for a depth location of the body part in 3D space. Using the location of various body parts in 3D space, the processor 160 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 160. The CNN module 190*b* may conduct inferences against the machine learning model (e.g., to perform object detection). The training may comprise determining weight values (e.g., neural network weight values) for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels, the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogenous processing resources (all circuits 190*a*-190*n* may have the same capabilities) or heterogeneous processing resources (two or more circuits 190*a*-190*n* may have different capabilities).

Figure 4:
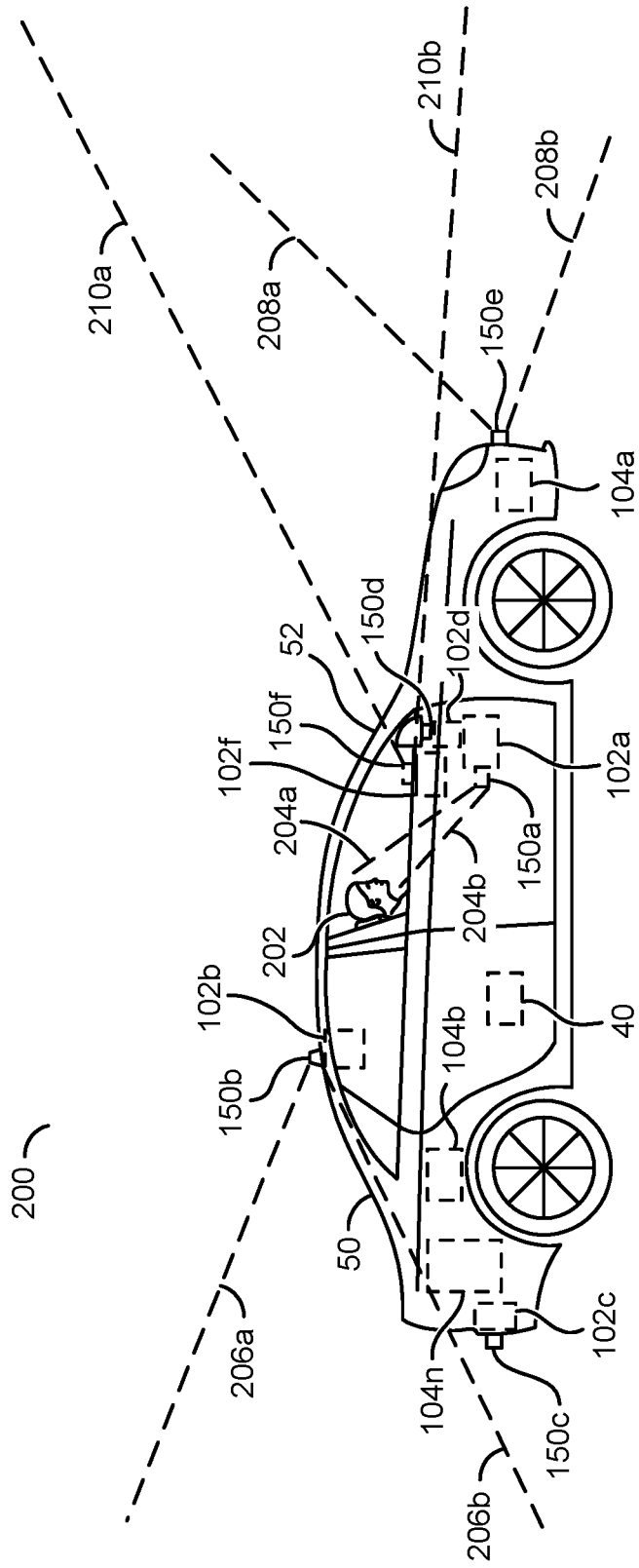
FIG. 4 is a diagram illustrating an example of camera systems inside and outside of a vehicle.

Referring to FIG. 4, a diagram illustrating an example of camera systems inside and outside of a vehicle is shown. A view 200 of an automobile/vehicle 50 is shown. The apparatus 100 is shown as various components component attached to and/or implemented in the vehicle 50 (e.g., the ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. A windshield 52 of the ego vehicle 50 is shown. The apparatus 100 may be distributed throughout the ego vehicle 50 (e.g., connections may be implemented between the apparatus 100 and the capture devices 102*a*-102*n* and/or the sensors 104*a*-104*n* such as a direct wired connection and/or a connection using the common bus line 40). Various capture devices 102*a*-102*n* and/or lenses 150*a*-150*n* are shown on (or in) the ego vehicle 50. In an example, the processor 160 may be an embedded device implemented within the ego vehicle 50. Various sensors 104a-104n are shown external to the ego vehicle 50. The interface 40 is shown within the ego vehicle 50. A location of the apparatus 100 may be varied according to the design criteria of a particular implementation.

A camera (e.g., the lens 150a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processor 160 may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals VIDEO may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 150b and the capture device 102b) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 150c and the camera sensor 102c on the rear bumper of the ego vehicle 50, the lens 150d and the camera sensor 102d shown on the side view mirror of the ego vehicle 50, etc.). For example, the targeted view (e.g., represented by a line 208a and a line 208b captured by the lens 150e) may provide a front exterior view of an area. In another example, a redundant targeted view (e.g., represented by a line 210a and a line 210b captured by the lens 150f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture device 102f may be implemented within the ego vehicle 50. The field of view 210a-210f of the lens 150f may be captured through the windshield 52. For example, the capture device 102f may be operational while the ego vehicle 50 is powered off. The capture device 102f (and other of the capture devices 102a-102n) may operate as security cameras for the ego vehicle 50.

The capture devices 102a-102n may be configured to capture video data of the environment around (e.g., area near) the ego vehicle 50. The processor 160 may implement computer vision to detect objects and/or understand what is happening near the ego vehicle 50 (e.g., see the environment as a human driver would see the environment). The sensors 104a-104n may be implemented using proximity detection technology. For example, the sensors 104a-104n may implement a radar device, an array of radars, a sonar device, an array of sonars, a lidar device, an array of lidar devices, an ultra-sound device, an array of ultra-sound devices, etc.

The processor 160 may be configured to implement sensor fusion (e.g., one of the hardware modules 190a-190n). The sensor fusion may aggregate data from the sensors 104a-104n, the CNN module 190b and/or the video pipeline to build a model and/or abstraction of the environment around the ego vehicle 50 (e.g., when the capture devices 102a-102n are in the video capture mode of operation). For example, when the ego vehicle 50 is in operation (e.g., the driver 202 is driving the ego vehicle 50), the computer vision operations may enable the processor 160 to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion may enable a comparison and/or cross-reference of the data received from the vehicle sensors 104a-104n at a particular time to the video data captured at another particular time in order to adjust a confidence level of an inference. The type of inferences made by the processors 160 may be varied according to the design criteria of a particular implementation.

The processor 160 may be configured to analyze the captured video signal. The processor 160 may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processor 160 may be configured to determine a presence, an absolute location and/or a relative location of the detected objects. Based on the detected objects, the processor 160 may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

One of the hardware modules 190a-190n may implement a decision making module. The decision making module of the processor 160 may make a decision based on data received at various inputs and/or various data inferred by the processor 160. For example, the data received may comprise external signals generated in response to user input, external signals generated by the sensors 104a-104n and/or internally generated signals such as signals generated by the processor 160 in response to analysis of the video data and/or objects detected in video data.

The processor 160 may process video data that may not be seen by a person (e.g., not output to a display such as an electronic mirror and/or infotainment system). For example, the video data may be internal to the processor 160. Generally, the processor 160 perform the computer vision operations in order to interpret the environment to emulate how a person would see the environment and/or provide greater sensory capability than a human. For example, the processor 160 may interpret the environment in many directions at once (e.g., a 360 degree field of view) while a person has a limited field of view.

The video analytics performed by the processor 160 may be performed on more than one video frame. For example, the processor 160 may analyze a series (or sequence) of video frames. In some embodiment, the processor 160 may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processor 160 may implement depth-sensing techniques. The depth-sensing techniques may compare knowledge of the dimensions of the ego vehicle 50 to the location and/or body position of the occupants. The processor 160 may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module of the processor 160 to generate inferences about body characteristics to determine age, gender, and/or condition (e.g., wrinkles, facial structure, bloodshot eyes, eyelids, signs of exhaustion, etc.).

The processor 160 may be configured to detect faces in a region of a video frame. In some embodiments, facial recognition may be implemented (e.g., based on faces stored as references in the memory 156 and/or an external database accessible by the communication devices 164). In some embodiments, the processor 160 may be configured to detect objects and classify the objects as a particular type of object (e.g., an elderly person, a child, an animal, etc.).

The processor 160 may implement a "diagnosis" and/or a confidence level for recognizing and/or classifying the objects. In some embodiments, the sensor fusion module of the processor 160 may be used to combine information from the sensors 104a-104n to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processor 160 may determine a type of the detected objects based on a classification. The classification may be based on information extracted from the video data and/or information from the sensors 104a-104n (e.g., environmental factors). For example, the color histogram, the high frequency component and/or video analytics of the video data may be compared to some known reference. In another example, temperature and/or humidity information may be provided by the sensors 104a-104n (e.g., to distinguish a cold person from a hot person). The processor 160 may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processor 160.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processor 160. The processor 160 may be configured to determine a current size, shape and/or color of the objects (e.g., to perform a classification). One or more of the objects may be detected in each video frame. The processor 160 may determine a number of pixels (e.g., a width, a height and/or a depth) comprising the detected objects in each video frame portion of a video frame and/or region of a video frame. Based on the number of pixels of each of the detected objects in the video frame, the processor 160 may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames (or pixel data) generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module of the processor 160 may enable the computer vision operations to be supplemented by the user of the sensors 104a-104n (e.g., radar, occupancy sensors, temperature sensors, location/orientation sensors, etc.). The type of capture devices implemented may be varied according to the design criteria of a particular implementation.

The memory 156 may store the pre-determined locations and/or a pre-determined field of view of each of the capture devices 102a-102n. The memory 156 may store reference data corresponding to the objects. For example, the memory 156 may store reference color histograms about various known types of objects. In another example, the memory 156 may store previously captured frames (e.g., a reference image from when the ego vehicle 50 was parked, when the ego vehicle 50 came out of production, a reference image from when a car was in operation, turned off, left unattended, etc.). The type of reference information stored by the memory 156 may be varied according to the design criteria of a particular implementation.

The CNN module 190b may be configured to "train" the processor 160 to know (e.g., store in the memory 156) the objects and/or expected locations (or areas) that the objects may detect in a video frame. The video analytics performed by the processor 160 may determine whether the detected objects are exterior to or interior to the ego vehicle 50. The processor 160 may be configured to respond differently to different types of objects. For example, if the classified object is a person, the processor 160 may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 190b may be trained to recognize when a car seat is empty. In another example, the CNN module 190b may be configured to recognize when a child, person, pet and/or a type of inanimate object is present in the seat. Comparing the seat in the current video frame to a reference empty seat may enable the processor 160 to detect the presence of occupants even if there is no motion by the occupants.

The processor 160 may determine the width of the reference objects (e.g., based on the number of pixels occupied in the video frame). The memory 156 may store (e.g., in a look up table) the width of the reference objects. The processor 160 may determine the width of the reference objects (e.g., the number of pixels in the video frame). The width of the current size of the reference object may be compared to the stored width of the reference object to estimate a distance of the occupants of the ego vehicle 50 from the lens 150a-150n. For example, a number of pixels may be measured between the reference object and the head of the driver 202 to determine location coordinates of the head of the driver 202.

In some embodiments, the processor 160 may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 160 may determine body position, body characteristics and/or the vulnerability of the occupants.

In some embodiments, the processor 160 may be configured to approximate the gaze of the driver 202. For example, the drowsiness and/or attentiveness of the driver 202 may be detected (e.g., recognizing that eyes are closing, recognizing that the head is drifting down, etc.). In another example, the processor 160 may present the recording of the driver 202 to a display (e.g., as a live stream for use in teleconferencing). The processor 160 may be configured to recognize the driver 202 through facial recognition.

The memory 156 (e.g., in a look up table) may store a reference size (e.g., the number of pixels of a particular reference object in a video frame at a known distance) of particular objects. In another example, the memory 156 may store a reference shape (e.g., an arrangement of pixels of the reference object in the video frame at a known distance). In yet another example, the memory 156 may store a reference color (e.g., a RGB value and/or a YCbCr value for each of the pixels of the reference object in the video frames). The processor 160 may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 150a-150n and/or the capture devices 102a-102n may be configured to implement stereo vision. For example, the lenses 150a-150n and/or the capture devices 102a-102n may be arranged to capture multiple perspectives of a location. Using the multiple perspectives, the processor 160 may generate a depth map. The depth map generated by the processor 160 may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processor 160 may analyze reference video frames. Reference video frames may be used by the processor 160 to classify, analyze and/or store reference objects. The reference objects may be used by the processor 160 to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processor 160 may compare the current video frame to the reference video frame. In some embodiments, the current video frame may not be directly compared to the reference video frame. For example, the CNN module 190b may implement deep learning to gather information and/or statistics about various features of objects. The CNN module 190b may determine features of objects and/or sub-objects corresponding to the current video frame. The processor 160 may compare the features extracted from the current video frame to features extracted from numerous reference video frames. For example, the reference video frame and/or the current video frame may be used as training data for the CNN module 190b. The types of features extracted from video frames to perform the computer vision analysis may be varied according to the design criteria of a particular implementation.

Figure 5:
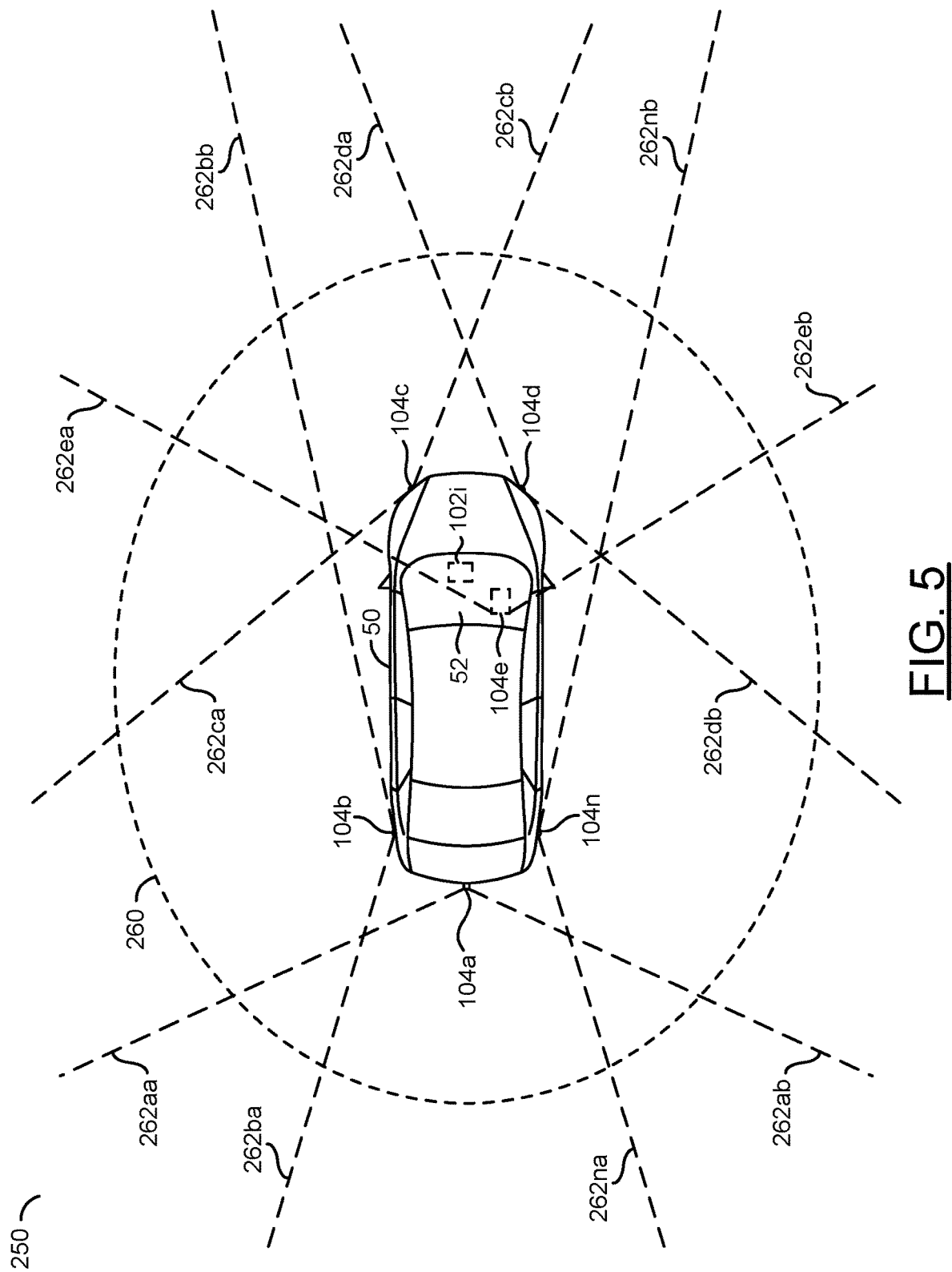
FIG. 5 is a diagram illustrating an all-around view captured by the capture device and a range of the sensors on an overhead view of a vehicle.

Referring to FIG. 5, a diagram illustrating an all-around view captured by the capture device and a range of the sensors on an overhead view of a vehicle is shown. An overhead view 250 of the ego vehicle 50 is shown. Components of the apparatus 100 are shown within (or on an external portion of) the ego vehicle 50. The capture device 102i is shown. The capture device 102i may be located behind the windshield 52 (e.g., within a cabin of the ego vehicle 50).

Each of the lenses 150a-150n may be directed to capture a different field of view (not shown). The various fields of view captured by the capture devices 102a-102n may be used to generate an all-around view with respect to the ego vehicle 50. A dotted circle 260 is shown. The dotted circle 260 may represent an exterior field of view from the perspective of the ego vehicle 50 captured by the apparatus 100. The processor 160 may be configured to combine the video data captured by the capture devices 102a-102n to form the exterior field of view 260. The exterior field of view 260 may be a 360 degree field of view (e.g., a field of view that captures video data in all or most directions around the ego vehicle 50, a field of view that surrounds the ego vehicle 50, etc.). The lenses 150a-150n and the corresponding fields of view (e.g., the fields of view 206a-206b, 208a-208b, 210a-210b, etc.) and/or data from other lenses may be combined to enable the processors 106a-106n to have access to video data over the full 360 degree field of view 260. For example, the all-around field of view 260 may be available when the capture device 102a-102n are operating in the video capture mode of operation. The all-around field of view 360 may not be available when the capture devices 102a-102n are operating in the standby mode of operation.

In some embodiments, the processor 160 may be configured to perform video stitching operations and/or de-warping operations to form the 360 degree field of view 260. In some embodiments, the processor 160 may be configured to analyze the video data captured by each of the capture devices 102a-102n and aggregate the results to make inferences about all the video data in the 360 degree field of view 260 (e.g., the video data from each field of view may be analyzed individually, and the results may be combined to effectively create the 360 degree field of view 260, even if a single video stream of all 360 degrees around the ego vehicle 50 is never actually created).

While a generally circular shape for the 360 degree field of view 260 is shown, the particular shape of the 360 degree field of view 260 may not be circular. For example, the range of each of the capture devices 102a-102n may be different. In another example, the physical location of the capture devices 102a-102n on the ego vehicle 50 may determine how far from the ego vehicle 50 the field of view 260 is able to reach. The 360 degree field of view 260 may have an irregular shape. The circular shape of the 360 degree field of view 260 is shown for illustrative purposes. For example, the range of the 360 field of view 260 may extend farther from the ego vehicle 50 than shown. In some embodiments, the 360 degree field of view 260 may be spherical (e.g., capture the environment above the ego vehicle 50). In some embodiments, the field of view 260 may not be a full 360 degree field of view (e.g., locations below the ego vehicle 50 may not be captured).

The processor 160 may be further configured to perform computer vision operations on the video data captured in the 360 degree field of view 260 (which may provide an approximation of what the driver 202 would be able to see if the driver 202 was in the ego vehicle 50 and looking in multiple directions simultaneously) and more. For example, the computer vision operations performed by the processor 160 may be configured to detect and/or recognize objects. The computer vision operations performed by the processor 160 may be further configured to detect characteristics of objects and/or changes to the characteristics over time.

The sensor fusion performed by the processor 160 may be configured to combine information about the objects detected from analyzing the video data captured with a detection of objects using the proximity sensors (e.g., one or more of the sensors 104a-104n configured to implement radar, lidar, etc.). The sensor fusion may be further configured to mathematically weight the information received from the computer vision operations (e.g., modify coefficients to represent how likely the detections made by the computer vision operations are correct based on the detections made by the proximity sensors). For example, the sensor fusion may be configured to mathematically weight the information provided by each sensor (e.g., a confidence level of the computer vision detection, a confidence level of the detection of the sensors 104a-104n, the distance limitations of the sensors 104a-104n, whether the computer vision detects the object at a distance beyond the range of the sensors 104a-104n, etc.). The ego vehicle 50 may implement the apparatus 100 that enables computer vision and 360 degree cameras to provide the exterior field of view 260 combined with additional information from the sensors 104a-104n (e.g., such as ultrasonics, radars, gyroscope, accelerometer, etc.).

When the capture devices 102a-102n are in the video capture mode of operation, the processor 160 may be configured to detect events. In some embodiments, the event may be information that warrants being brought to the attention of the driver 202 (e.g., if present in the ego vehicle 50) and/or the attention of the owner of the ego vehicle 50 (e.g., if the ego vehicle 50 is unoccupied). In some embodiments, the event may be information about the nearby vehicles. In some embodiments, the event may be a detected scenario that the apparatus 100 should react to (e.g., avoid collisions, provide warnings, store information, avoid roadway hazards such as potholes, elevated surfaces, declined surfaces, etc.). For example, whether a detected scenario is considered an event may be determined by the processor 160. In one example, the event may correspond to detecting that another vehicle, a pedestrian, a speed bump or another obstacle may be on a collision course with the ego vehicle 50. In yet another example, the event may be a security concern (e.g., a person approaching the ego vehicle 50 while parked). The events may be detected based on the computer vision operations performed on the video data captured using the capture devices 102a-102n in the video capture mode of operation. The events may be detected based on readings from the sensors 104a-104n. For example, the sensor fusion may be configured to combine information determined using the computer vision operations and information detected using the sensors 104a-104n to make inferences that may be used by the processor 160.

The processor 160 may be configured to generate annotated video frames (e.g., labeled video frames). The annotated video frames may comprise the pixel data that corresponds with detected events. The apparatus 100 may be configured to use disparate sources of information (e.g., the computer vision operations and readings from the sensors 104a-104n) to detect the event and/or the pixel data that corresponds to the detected event. The wakeup signal WAKE may be one source of data that indicates an event has been detected. The computer vision operations performed after the capture devices 102a-102n have been activated may be used to detect (or confirm) the event. The combination of the data sources may be used to accurately identify the event in the video frames. The annotations provided in the video frames communicated to the central/distributed server (e.g., using the established wireless connection when operating in the video capture mode of operation) may be used as training data. The training data may be used to train the artificial intelligence model used for detecting objects by the CNN module 190b.

The sensors 104a-104n are shown located on an exterior of the ego vehicle 50. The sensors 104a-104n are shown at various locations to capture input from various perspectives with respect to the ego vehicle 50. The sensor 104a may be located on a rear end of the ego vehicle 50. The sensors 104c-104d may be located on a front end of the ego vehicle 50. The sensor 104b may be located on a driver side of the ego vehicle 50. The sensor 104e may be mounted to the front windshield 52 of the ego vehicle 50. The sensor 104n may be located on a passenger side of the ego vehicle 50. In some embodiments, the sensors 104a-104n may only be located to capture input that corresponds with the available capture devices 102a-102n. For example, if only the capture device 102i is implemented, the capture devices towards the rear of the ego vehicle 50 may be unnecessary (since the capture device 102i may be unable to capture video towards the rear of the ego vehicle 50). The arrangement of the sensors 104a-104n on the exterior of the ego vehicle 50 may be varied according to the design criteria of a particular implementation.

Dotted lines 262aa-262ab are shown extending from the sensor 104a. Dotted lines 262ba-262bb are shown extending from the sensor 104b. Dotted lines 262ca-262cb are shown extending from the sensor 104c. Dotted lines 262da-262db are shown extending from the sensor 104d. Dotted lines 262ea-262eb are shown extending from the sensor 104e. Dotted lines 262na-262nb are shown extending from the sensor 104n. Each of the dotted line pairs 262aa/262ab-262na/262nb may represent a field of input captured by the sensors 104a-104n. In the example shown, the field of input 262aa/262ab-262na/262nb may generally capture all areas external to the ego vehicle 50 (e.g., a 360 degree field of input). The field of input 262aa/262ab-262na/262nb may enable the sensors 104a-104n to detect potential events at any location near the ego vehicle 50.

In an example, if a person is detected (e.g., based on motion, based on distance detected, based on temperature, based on a combination of sensor inputs, etc.) in the field of input 262ea-262eb, the sensor 104e may detect a trigger condition. The sensor 104e may generate the signal WAKE E. The signal WAKE E may be presented to the capture device 102i. The capture device 102i may change from the standby mode of operation to the video capture mode of operation in response to the wakeup signal WAKE E. The capture device 102i may capture video data after the video capture mode of operation is activated. In an example where multiple capture devices 102a-102n are implemented (or if the capture device 102i is a surround view camera capturing a surround field of view) then the all-around view 260 may be generated.

Figure 6:
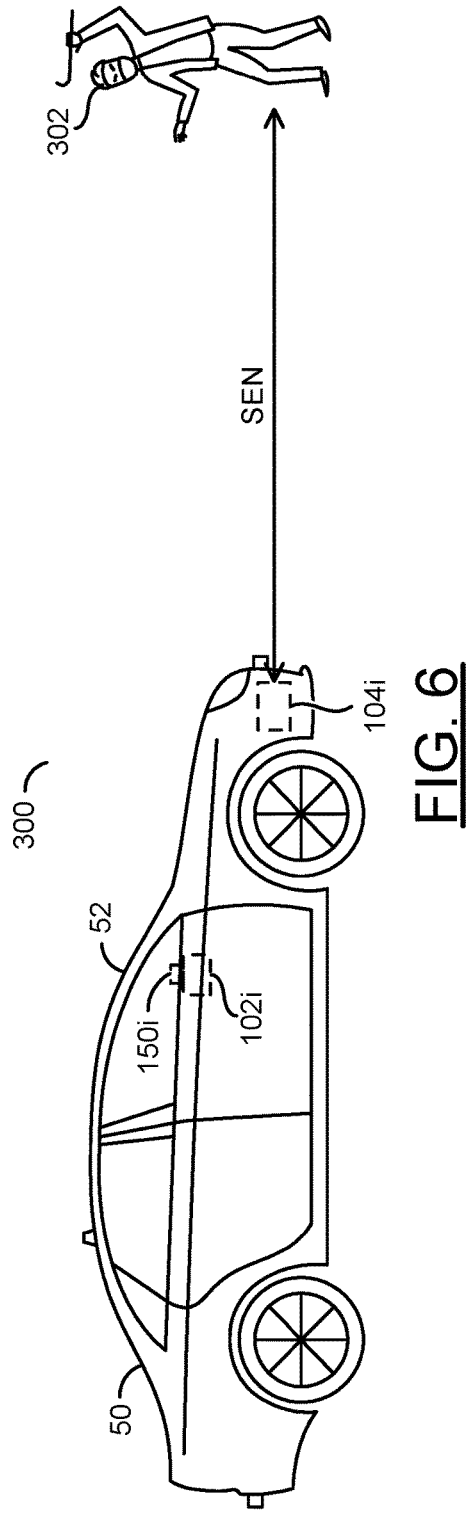
FIG. 6 is a diagram illustrating a detection of an event by the sensors.

Referring to FIG. 6, a diagram illustrating a detection of an event by the sensors is shown. A scenario 300 is shown. The scenario 300 may be an example of when the ego vehicle 50 is parked. For example, the ego vehicle 50 may be unoccupied and/or unattended (e.g., the driver 202 is not shown). In the scenario 300, the capture devices 102a-102n may operate in the standby mode of operation.

The ego vehicle 50 is shown in the scenario 300 comprising the capture device 102i, the sensor 104i and/or the lens 150i. The capture device 102i may be a representative example of any one or more of the capture devices 102a-102n. The sensor 104i may be a representative example of any one or more of the sensors 104a-104i. The lens 150i may be a representative example of any one or more of the lenses 150a-150n of the respective capture devices 102a-102n.

In the example shown, the capture device 102i and the lens 150i are shown within an interior (e.g., a cabin) of the ego vehicle 50. For example, the lens 150i is shown behind the windshield 52. The capture device 102i may be directed to capture the environment external to the ego vehicle 50 through the windshield 52 (e.g., capture towards the front of the ego vehicle 50).

The sensor 104i is shown on an exterior of the ego vehicle 50. The sensor 104i is shown remotely located with respect to the capture device 102i. For example, the sensor 104i may not be located behind the windshield 52 (e.g., not in the cabin of the ego vehicle 50 with the capture device 102i and/or the lens 150i). The sensor 104i may operate without being limited, restricted and/or interfered with by the windshield 52. For example, if the sensor 104i implements a PIR sensor, by being implemented outside of the ego vehicle 50, the infrared light emitted by the sensor 104i may not be interfered with by the windshield 52. In some embodiments, the sensor 104i may be located on the windshield 52 (e.g., mounted to the windshield 52).

A person 302 is shown. The person 302 may be a representative example of an event. In the example shown, the person 302 may be a suspicious person (e.g., a potential criminal holding a crowbar that may attempt to break into the ego vehicle 50). The event 302 may not necessarily be a potential criminal. In one example, the event 302 may be a pedestrian (e.g., a person that is not even aware of the ego vehicle 50), an animal (e.g., a dog or cat walking near the ego vehicle 50), another vehicle (e.g., a car parking near the ego vehicle 50), another type of object (e.g., an unattended shopping cart left near the ego vehicle 50), etc. The type of event detected using the apparatus 100 may be varied according to the design criteria of a particular implementation.

While the capture device 102i is in the standby mode of operation, the person 302 may not be captured by the capture device 102i and/or video frames of the person 302 may not be generated. The capture device 102i may be in the standby mode of operation to limit an amount of drain on the battery 42. The person 302 may be approaching the ego vehicle 50. If the capture device 102i relies on physical contact by the person 302 with the ego vehicle 50 before activating the video capture mode of operation, the person 302 may have already damaged the ego vehicle 50.

A signal (e.g., SEN) is shown. The signal SEN may comprise an input detected by the sensor 104i. When the signal SEN is above a threshold value, the trigger condition may be detected. In one example, the signal SEN may be a motion detected by a PIR sensor. In another example, the signal SEN may be a temperature detected by a temperature sensor. In yet another example, the signal SEN may be a size of the person 302 and/or a distance of the person 302 from the ego vehicle 50 by a proximity sensor and/or a radar/lidar sensor. In still another example, the signal SEN may be a sound (e.g., an audio amplitude and/or frequency) captured near the ego vehicle 50 by a microphone and/or audio processor. The type of input provided by the input SEN may be varied depending on the type of the sensor 104i implemented. The threshold value may be varied according to the type of input detected.

When the signal SEN is above the threshold amount for the trigger condition, the event 302 may be detected. In one example, if the signal SEN is below the threshold condition, no reaction may be performed by the sensor 104i. In another example, if the signal SEN is below the threshold condition, the sensor 104i may report the reading on the interface 40 (e.g., the OBD-II port, the CAN bus) and the reading may be utilized by various components of the ego vehicle 50. The input SEN may not necessarily indicate what the event 302 actually is. For example, the input SEN may not indicate that the event 302 detected corresponds to a person approaching the ego vehicle 50 and/or that the person 302 is holding a crowbar. The input SEN may provide an indication of some type of physical reaction (e.g., a motion, a temperature change, a distance to an object, etc.) has been detected by the sensor 104i that may correspond to an event that may be worth further investigation using the capture device 102i.

When the input SEN is above the threshold amount, the sensor 104i may communicate that the trigger condition has been detected. In response to the signal SEN, the sensor 104i may communicate the wakeup signal WAKE. The signal WAKE may be received by the capture device 102i. The capture device 102i may exit the standby mode of operation in response to the signal WAKE.

In the standby mode of operation, the processor 160 of the capture device 102i may operate in a low powered mode of operation. For example, the processor 160 may disable various features of the capture device 102i. The processor 160 may be configured to monitor the communication device 120i (e.g., the communication device 120i may not be powered down). The processor 160 may disable the communication module 164 (e.g., features such as LTE and/or Wi-Fi may be disabled). In some embodiments, the processor 160 may disable various hardware modules 190a-190n (e.g., since video capture, encoding, computer vision operations may be disabled, etc.). Since the processor 160 may disable various features of the capture device 102i, the amount of power consumed by the processor 160 and/or the capture device 102i may be low.

In response to the communication device 120i receiving the wakeup signal, the processor 160 may change the mode of operation of the capture device 102i to the video capture mode of operation. The processor 160 may enable one or more of the hardware modules 190a-190n. The processor 160 may continue to monitor the communication device 120i. The processor 160 may enable the communication module 164. The processor 160 may operate at full power, as necessary (e.g., the processor 160 may efficiently perform operations and only consume the power needed for the particular operations).

In some embodiments, the processor 160 may not switch modes of operation until at least two of the sensors 104a-104n provide the wakeup signal. For example, the processor 160 may wait for more than one of the sensors 104a-104n to confirm the triggering event before changing the modes of operation. For example, motion detected by one of the sensors 104a-104n may result in the wakeup signal being generated, but may be a false positive. A second wakeup signal generated by another one of the sensors 104a-104n may provide a confirmation of the triggering event.

Figure 7:
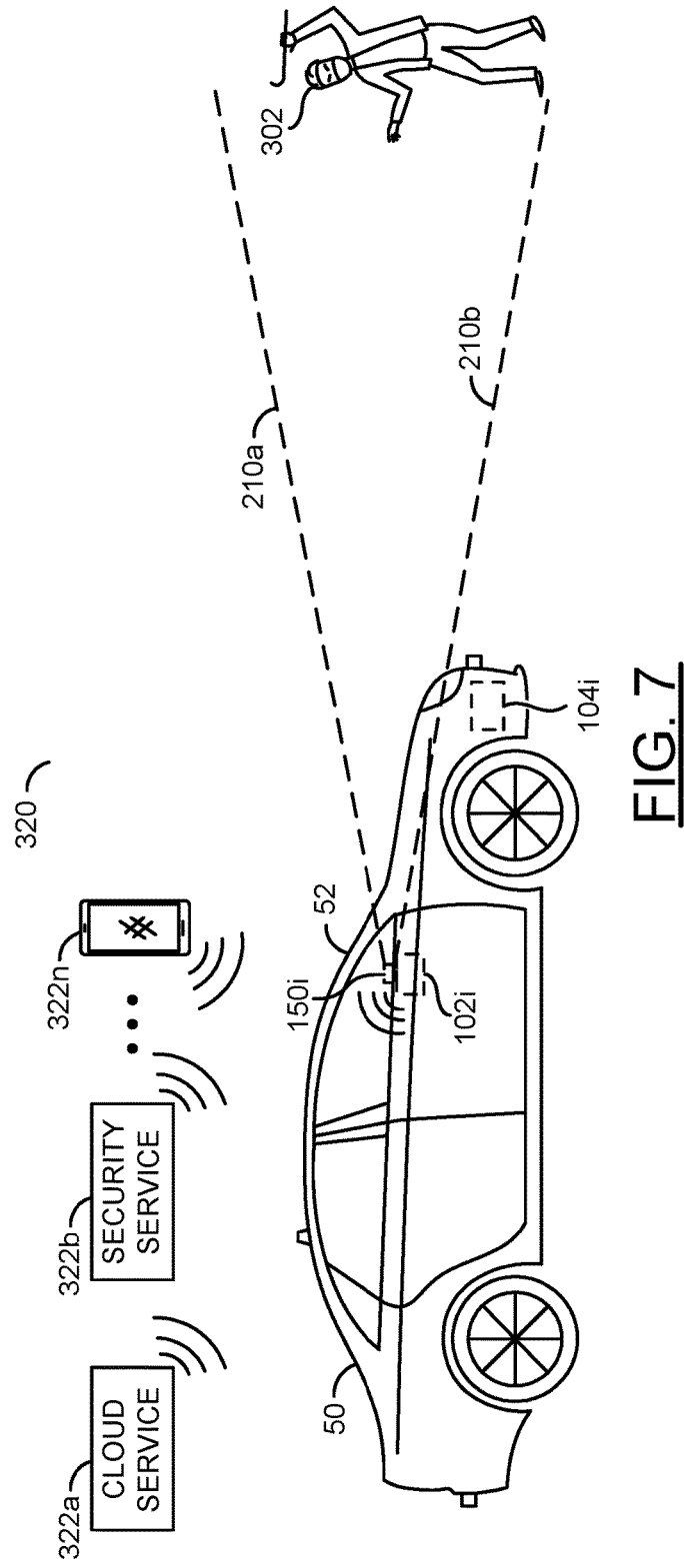
FIG. 7 is a diagram illustrating the capture device capturing a context of the event.

Referring to FIG. 7, a diagram illustrating the capture device capturing a context of the event is shown. A scenario 320 is shown. The scenario 320 may be an example of when the ego vehicle 50 is parked. The scenario 320 may occur at a time after the scenario 300 shown in association with FIG. 6. In the scenario 320, the capture devices 102a-102n may operate in the video capture mode of operation. For example, the scenario 320 may occur after the sensor 104i detected the trigger condition and generated the signal WAKE.

The ego vehicle 50 is shown in the scenario 320 comprising the capture device 102i, the sensor 104i and/or the lens 150i. The capture device 102i may be a representative example of any one or more of the capture devices 102a-102n. The sensor 104i may be a representative example of any one or more of the sensors 104a-104i. The lens 150i may be a representative example of any one or more of the lenses 150a-150n of the respective capture devices 102a-102n.

After the sensor 104i detects the event 302, the wakeup signal WAKE may be generated and the capture device 102i may change a mode of operation to the video capture mode of operation. The video capture mode of operation may enable the capture device 102i to generate pixel data of the event 302 detected as the trigger condition by the sensor 104i. Generation of the pixel data may occur when the capture device 102i activates the video capture mode of operation.

The field of view 210a-210b of the lens 150i is shown. The field of view 210a-210b is shown originating from the lens 150i in the cabin of the ego vehicle 50. The field of view 210a-210b is shown through the windshield 52 of the ego vehicle 50. The field of view 210a-210b is shown directed towards the event 302. For example, the field of view 210a-210b may be generally directed towards the same area of the ego vehicle 50 as the direction of the input received by the sensor 104i.

The capture device 102i may generate pixel data of the region within the field of view 210a-210b. The pixel data of the region within the field of view 210a-210b may be converted into video frames (e.g., by the processor 160). The processor 160 may generate the video frames to be stored by the memory 156 (e.g., a video recording). The processor 160 may communicate a video stream comprising the video frames using the communication module 164. The processor 160 may be configured to perform computer vision operations on the video frames.

In some embodiments, the communication module 164 may be configured to communicate the video stream to a remote device. Remote devices 322a-322n are shown. The remote device 322a may be a cloud storage service. For example, the cloud storage service 322a may provide mass storage for the video streams. In another example, the video stream may be provided to the cloud storage service 322a to be used as training data (e.g., to further refine the classification and/or object detection capabilities). The remote device 322b may be a security service. In an example, the security service 322b may monitor the video stream and contact authorities in response to detecting the person 302. The remote device 322n may be a smartphone. In an example, the video stream may be streamed to the smartphone 322n of the driver 202. Other types of remote devices 322a-322n may be the recipient of the video stream transmitted by the communication module 164. The number and/or type of remote devices 322a-322n communicated to using the communication module 164 may be varied according to the design criteria of a particular implementation.

The detection of the trigger condition by the sensor 104i may enable the capture device 102i to activate the video capture mode of operation before the person 302 reaches the ego vehicle 50. In the example shown, the person 302 is shown a distance away from the ego vehicle 50. Capturing the video frames and/or performing computer vision operations on the video frames generated while the person 302 is still some distance away from the ego vehicle 50 may enable a reaction to be performed before the event 302 detected causes damage and/or while particular features of the event 302 are still visible.

In the example shown, the person 302 may be a criminal attempting to break into the ego vehicle 50. Capturing the video frames of the person 302 after the person 302 reaches the ego vehicle 50 may be too late (e.g., the person 302 may have already smashed the windshield 52 and the damage is done). Capturing the person 302 before the person 302 reaches the ego vehicle 50 may enable the processor 160 to perform the computer vision operations. The computer vision operations may detect that the person is behaving suspiciously (e.g., the crowbar and mask may be detected, indicating a potential criminal). The reaction may be performed, such as sounding the alarm of the ego vehicle 50, contacting authorities, notifying the driver 202, etc.

In another example, the ego vehicle 50 may be damaged in a parking lot. Another car parked beside the ego vehicle 50 may cause a ding when the careless driver of the other car opens the door. If the camera is activated after the ding occurs, the other car may not be identified. For example, when the other car is already parked beside the ego vehicle 50, the capture devices 102a-102n may not have a view of the license plate of the other vehicle. If the sensors 104a-104n detect the other vehicle approaching, the capture devices 102a-102n may activate the video capture mode of operation before the other car parks. The video frames may be generated while the other car approaches the parking spot and the license plate may be recorded and/or detected (e.g., using OCR).

Figure 8:
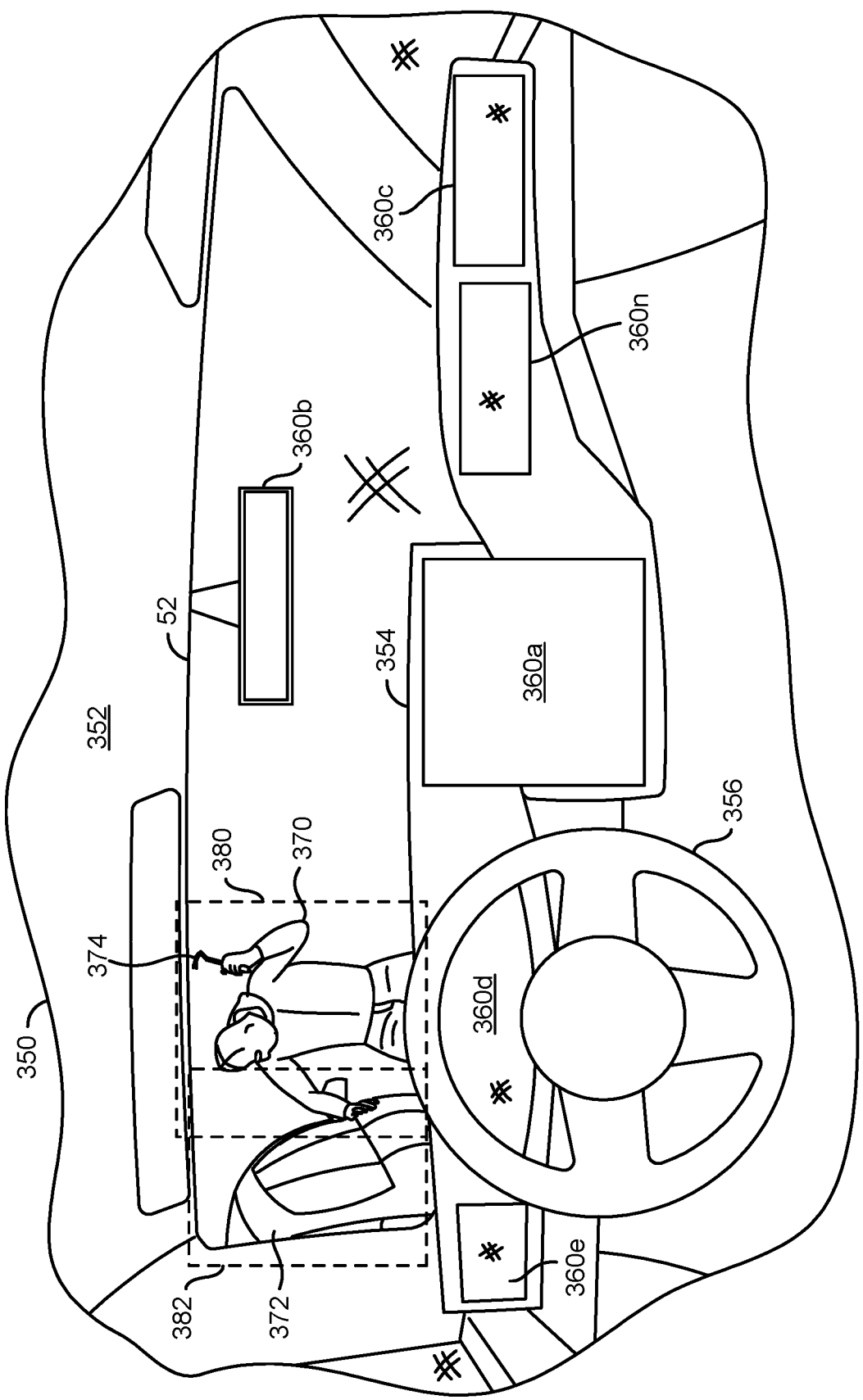
FIG. 8 is a diagram illustrating an example of computer vision performed when the capture device is in a video capture mode of operation.

Referring to FIG. 8, a diagram illustrating an example of computer vision performed when the capture device is in a video capture mode of operation is shown. A perspective 350 is shown. The perspective 350 may be a representation of a view of an interior 352 of the ego vehicle 50. The perspective 350 may generally provide a view of the interior 352 from the location and direction of the driver 202 but may not be what the driver 202 would actually see (e.g., may not be representative of a gaze direction). For example, the perspective 350 may represent one of the video frames generated by the capture device 102i implemented within the ego vehicle 50 shown in association with FIG. 7.

The interior 352 of the ego vehicle 50 may comprise the windshield 52, a dashboard 354 and/or a steering wheel 356. A number of displays 360a-360n are shown. In the example shown, the displays 360a-360n are shown throughout the interior 352. However, the number of the displays 360a-360n available in the ego vehicle 50 may be varied according to the design criteria of a particular implementation.

In the example shown, the display 360a may be located on the dashboard 354 next to the steering wheel 356. For example, the display 360a may be configured as an infotainment system of the ego vehicle 50. In the example shown, the display 360b may be located at the top of the windshield 52. For example, the display 360b may be configured to display video data corresponding to the rear view (e.g., emulating a traditional reflective rearview mirror). In the example shown, the display 360c may be located on the dashboard 354 to the far right of the interior 352. For example, the display 360c may be configured to display video data corresponding to the rear view from the passenger side (e.g., emulating a passenger side reflective mirror). In the example shown, the display 360d may be located on the dashboard 354 behind the steering wheel 356. The locations of the displays 360a-360n may be varied according to the design criteria of a particular implementation.

One or more of the displays 360a-360n may be configured to output the video frames generated by the capture devices 102a-102n while the capture devices 102a-102n are in the video capture mode of operation. For example, the signal VIDOUT generated by the processor 160 may be presented to one or more of the displays 360a-360n. In another example, one or more of the displays 360a-360n may be configured to display vehicle information (e.g., warning icons, speed, distance, temperature, odometer, etc.). In another example, one or more of the displays 360a-360n may be configured as an infotainment touchscreen display (e.g., providing a user interface for audio, navigation, hands-free phone communication, etc.). In the example shown in association with FIG. 8, the ego vehicle 50 may be parked (e.g., unoccupied). While the ego vehicle 50 is parked, the displays 360a-360n may be turned off.

A person 370 and another vehicle 372 are shown outside of the ego vehicle 50. The person 370 and the other vehicle 372 may be visible through the windshield 52. The person 370 is shown holding a crowbar 374. For example, the person 370 may be attempting to break into the other vehicle 372.

The person 370 may have been detected by one or more of the sensors 104a-104n. One or more of the sensors 104a-104n may have generated a respective one of the signals WAKE_A-WAKE_N. The capture device 102i may have activated the video capture mode of operation. In the video capture mode of operation, the capture device 102i may generate video frames comprising the perspective 350.

The processor 160 may be configured to perform computer vision operations on the video frame 350 and/or a sequence of video frames that comprises at least the video frame 350. A dotted shape 380 and a dotted shape 382 are shown. The dotted shapes 380-382 may represent the detection of an object by the computer vision operations performed by the processor 160. The dotted shapes 380-382 may comprise the pixel data corresponding to an object detected by the computer vision operations pipeline and/or the CNN module 190b of the processor 160. The dotted shapes 380-382 are shown for illustrative purposes. In an example, the dotted shapes 380-382 may be a visual representation of the object detection (e.g., the dotted shapes 380-382 may not appear on an output video frame displayed on one of the displays 360a-360n and/or a recorded video frame). In another example, the dotted shapes 380-382 may be a bounding box generated by the processors 106a-106n displayed on the output video frames to indicate that an object has been detected (e.g., the bounding boxes 380-382 may be displayed in a debug mode of operation).

The processor 160 may detect the person 370 attempting to break into the other vehicle 372. The processor 160 may detect the characteristics of the person 370. For example, the processor 160 may detect the crowbar 374 as one of the characteristics of the person 370. Based on the characteristics of the person 370 (and other objects detected), the processor 160 may determine the context of what is happening near the ego vehicle 50 and/or the behavior of the person 370. The processor 160 may determine that the person 370 is attempting to break into the other vehicle 372 and/or damage the other vehicle 372. The processor 160 may select a reaction based on the objects 380-382 detected, the behavior of the objects 380-382 and/or the context of the event detected.

In one example, the reaction may be to upload the recorded video frames to a service. In one example, the video frames generated by the processor 160 may be uploaded to the cloud service 322a (e.g., for review by the owner of the ego vehicle 50). In another example, the video frames may be uploaded to a service provided by an insurance provider (e.g., as evidence of damage and/or theft). In yet another example, the video frames may be uploaded to the security service 322b (e.g., authorities such as the police and/or other investigators).

In some embodiments, the reaction in response to the objects 380-382 detected may comprise a warning. In one example, the warning may be sounding a car alarm implemented by the ego vehicle 50. In another example, a voice notification may be implemented. For example, pre-recorded voice audio and/or procedurally generated voice audio may tell the person 370 to leave the area and/or that they have been recorded.

In some embodiments, the reaction in response to the objects 380-382 may comprise sending a notification to the owner of the ego vehicle 50. In one example, a generic notification may be communicated (e.g., a text message may state that an event has been detected at a particular time). In another example, the notification may comprise a still image of the event detected. In yet another example, the computer vision operations may interpret the scene (e.g., detect a break-in attempt) and covert the interpretation of the scene into human-readable text. For example, the notification may provide a warning that a break-in attempt has been detected. The type of reaction performed may be varied according to the design criteria of a particular implementation.

Generally, the capture devices 102a-102n may operate in the standby mode of operation. Without the sensors 104a-104n, the capture devices 102a-102n may not have been activated in response to the person 370. For example, the person 370 may be in physical contact with the other car 372 but not the ego vehicle 50. Without the sensors 104a-104n to activate the video capture mode of operation, the capture devices 102a-102n may not have captured the video frames of the person 370 until the person 370 damaged and/or attempted to break into the ego vehicle 50. Since the sensors 104a-104n have detected the person 370 (e.g., based on motion, sound, temperature, distance, etc.), the wakeup signal WAKE may activate the video capture mode of operation for the capture devices 102a-102n. The reaction to the computer vision operations performed in the video capture mode of operation may prevent the person 370 from attempting to damage and/or break into the ego vehicle 50.

Figure 9:
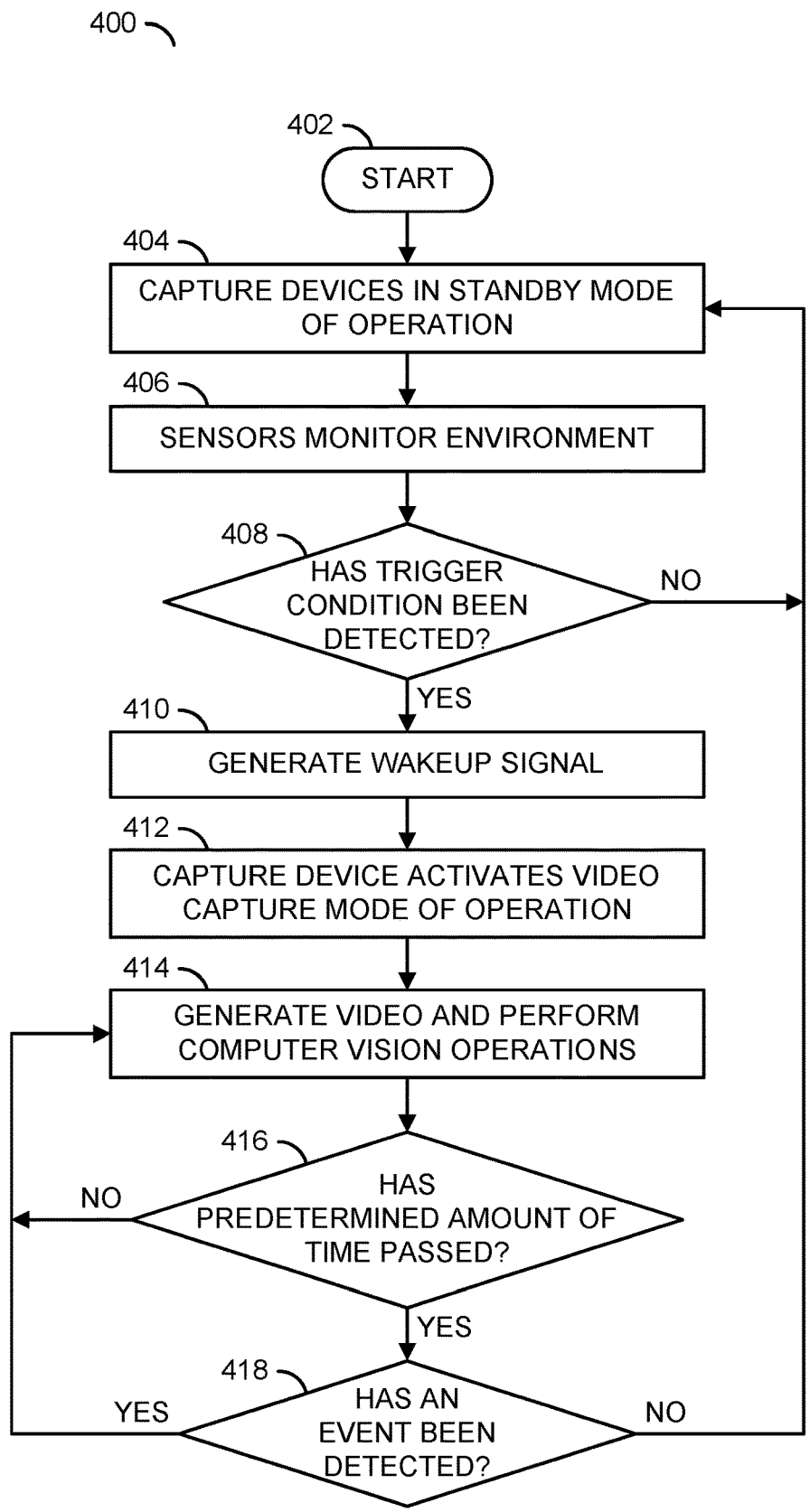
FIG. 9 is a flow diagram illustrating a method for triggering a car security camera.

Referring to FIG. 9, a method (or process) 400 is shown. The method 400 may trigger a car security camera. The method 400 generally comprises a step (or state) 402, a step (or state) 404, a step (or state) 406, a decision step (or state) 408, a step (or state) 410, a step (or state) 412, a step (or state) 414, a decision step (or state) 416, and a decision step (or state) 418.

The step 402 may start the method 400. In the step 404, the capture devices 102a-102n may operate in the standby mode of operation. Next (or in parallel), in the step 406, the sensors 104a-104n may monitor the environment (e.g., the fields of input 262aa/262ab-262na/262nb near the vehicle 50). Next, the method 400 may move to the decision step 408.

In the decision step 408, one or more of the sensors 104a-104n may determine whether a trigger condition has been detected. In an example, the trigger condition may be a detection of movement, a detection of proximity, a detection of temperature, a detection of audio, etc. above a pre-determined threshold. If no trigger condition has been detected, then the method 408 may return to the step 404. If a trigger condition has been detected, then the method 400 may move to the step 410.

In the step 410, one or more of the sensors 104a-104n may generate the corresponding wakeup signals WAKE_A-WAKE_N. In one example, the wakeup signals WAKE_A-WAKE_N may be received by the processor 160. In some embodiments, the processor 160 may determine the type of response to perform (e.g., where to direct the capture devices 102a-102n) based on the particular wakeup signals received. In some embodiments, the wakeup signals WAKE_A-WAKE_N may be communicated directly to the capture devices 102a-102n (e.g., wireless, or via the interface 40). Next, in the step 412, the capture devices 102a-102n may activate the video capture mode of operation. For example, the capture devices 102a-102n may change from the standby mode of operation to the video capture mode of operation in response to receiving one or more of the wakeup signals WAKE_A-WAKE_N. In the step 414, the capture devices 102a-102n may generate video and/or perform the computer vision operations on the captured video. Next, the method 400 may move to the decision step 416.

In the decision step 416, the capture devices 102a-102n may determine whether a pre-determined amount of time has passed. For example, the capture devices 102a-102n may remain in the video capture mode of operation for a particular amount of time (e.g., one minute). If the pre-determined amount of time has not passed, then the method 400 may return to the step 414. If the pre-determined amount of time has passed, then the method 400 may move to the decision step 418. In the decision step 418, the sensors 104a-104n and/or the processor 160 may determine whether an event has been detected. In one example, the sensors 104a-104n may continue to indicate that the event 302 has been detected. In another example, the processor 160 may determine (e.g., based on detections and/or decisions made in response to the computer vision operations) that the capture devices 102a-102n should remain in the video capture mode of operation. If the event has been detected, then the method 400 may return to the step 414 (e.g., continue in the video capture mode of operation until there is no longer an event). If the event has not been detected, then the method 400 may return to the step 404 (e.g., the capture devices 102a-102n may change to the standby mode of operation to preserve power).

Figure 10:
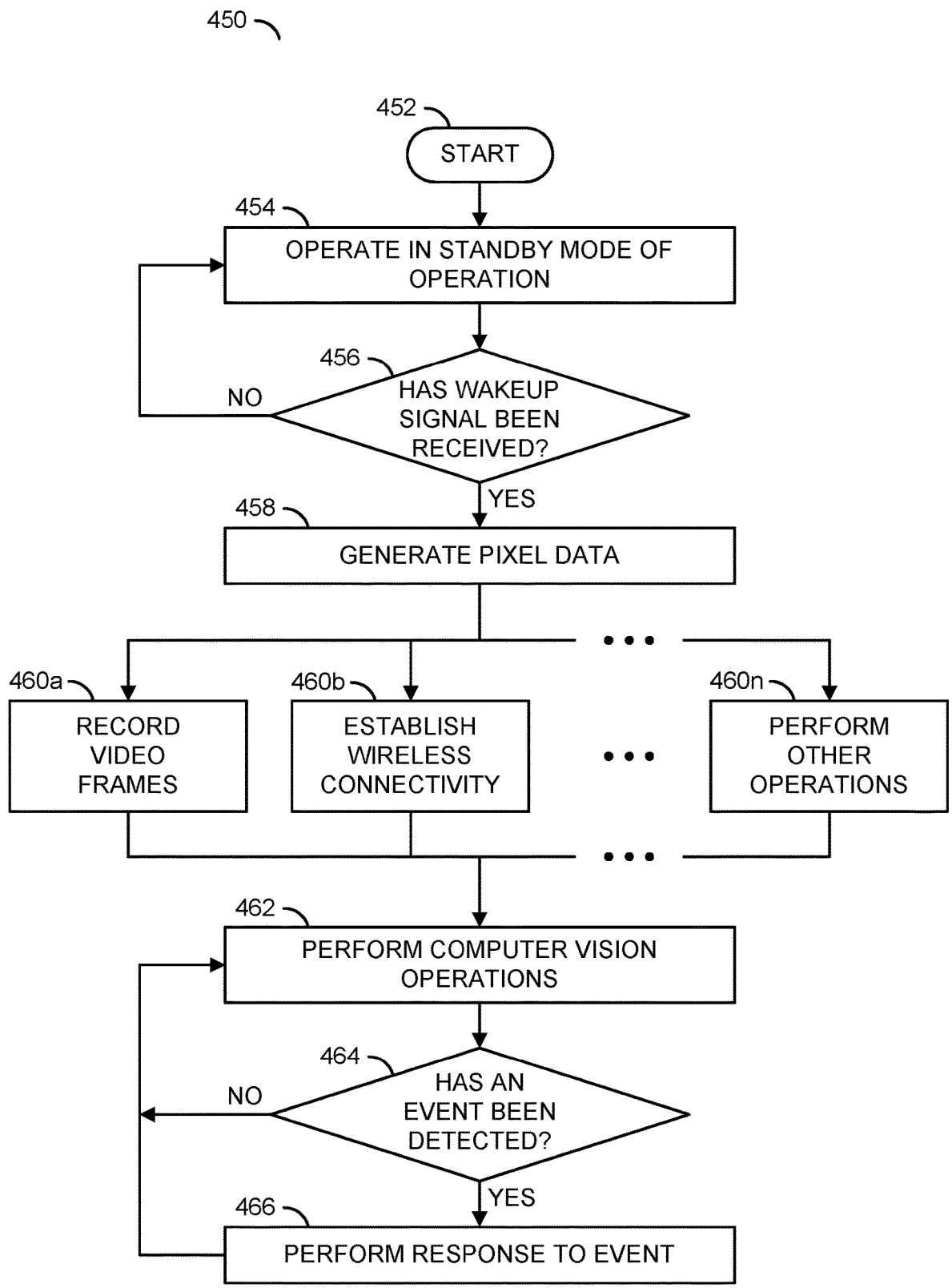
FIG. 10 is a flow diagram illustrating a method for activating camera features after a car security camera has been activated.

Referring to FIG. 10, a method (or process) 450 is shown. The method 450 may activate camera features after a car security camera has been activated. The method 450 generally comprises a step (or state) 452, a step (or state) 454, a decision step (or state) 456, a step (or state) 458, a steps (or states) 460a-460n, a step (or state) 462, a decision step (or state) 464, and a step (or state) 466.

The step 452 may start the method 450. In the step 454, the capture devices 102a-102n may operate in the standby mode of operation. For example, the processor 160 may select the standby mode of operation Next, in the decision step 456, the processor 160 may determine whether the wakeup signal has been received. For example, the processor 160 of the capture devices 102a-102n may scan the communication devices 120a-120n for wireless and/or wired signals that indicate an event has been detected by the sensors 104a-104n. If no wakeup signal has been received, then the method 450 may return to the step 454 (e.g., continue to operate in the standby mode of operation until an event has been detected). If a wakeup signal has been received, then the method 450 may move to the step 458. For example, the processor 160 may change the mode of operation of the capture device 102i to the video capture mode of operation in response to the wakeup signal. The step 458 may be part of the video capture mode of operation of the capture devices 102a-102n.

In the step 458, the capture devices 102a-102n may generate pixel data. For example, the pixel data may be presented to the processor 160 and/or the processor 182. Next, in the steps 460a-460n, the capture devices 102a-102n and/or the processor 160 may activate various functionality of the video capture mode of operation. The steps 460a-460n may be performed in parallel or substantially in parallel. In an example, the step 460a may comprise recording the captured video frames (e.g., storing video in the memory 156). In another example, the step 460b may comprise establishing the wireless connectivity. For example, the communication module 164 may communicate with one or more of the remote devices 322a-322n. Other operations may be performed (e.g., transcoding video, encoding video, dewarping video, etc.). Next, the method 450 may move to the step 462.

In the step 462, the CNN module 190b may perform the computer vision operations on the video frames generated. Next, in the decision step 464, the processor 160 may determine whether an event has been detected. In an example, the event may be determined according to feature detection parameters for detecting various objects, characteristics of objects and/or behaviors of objects. If no event has been detected, then the method 450 may return to the step 462. If an event has been detected, then the method 450 may move to the step 466. In the step 466, the processor 160 may select a response to perform in based on the event detected. For example, a response may be a null response (e.g., no action), continue monitoring the object, contacting the security services 322b, etc. Next, the method 450 may return to the step 462. For example, the computer vision operations may be performed for as long as the capture devices 102a-102n remain in the video capture mode of operation.

Figure 11:
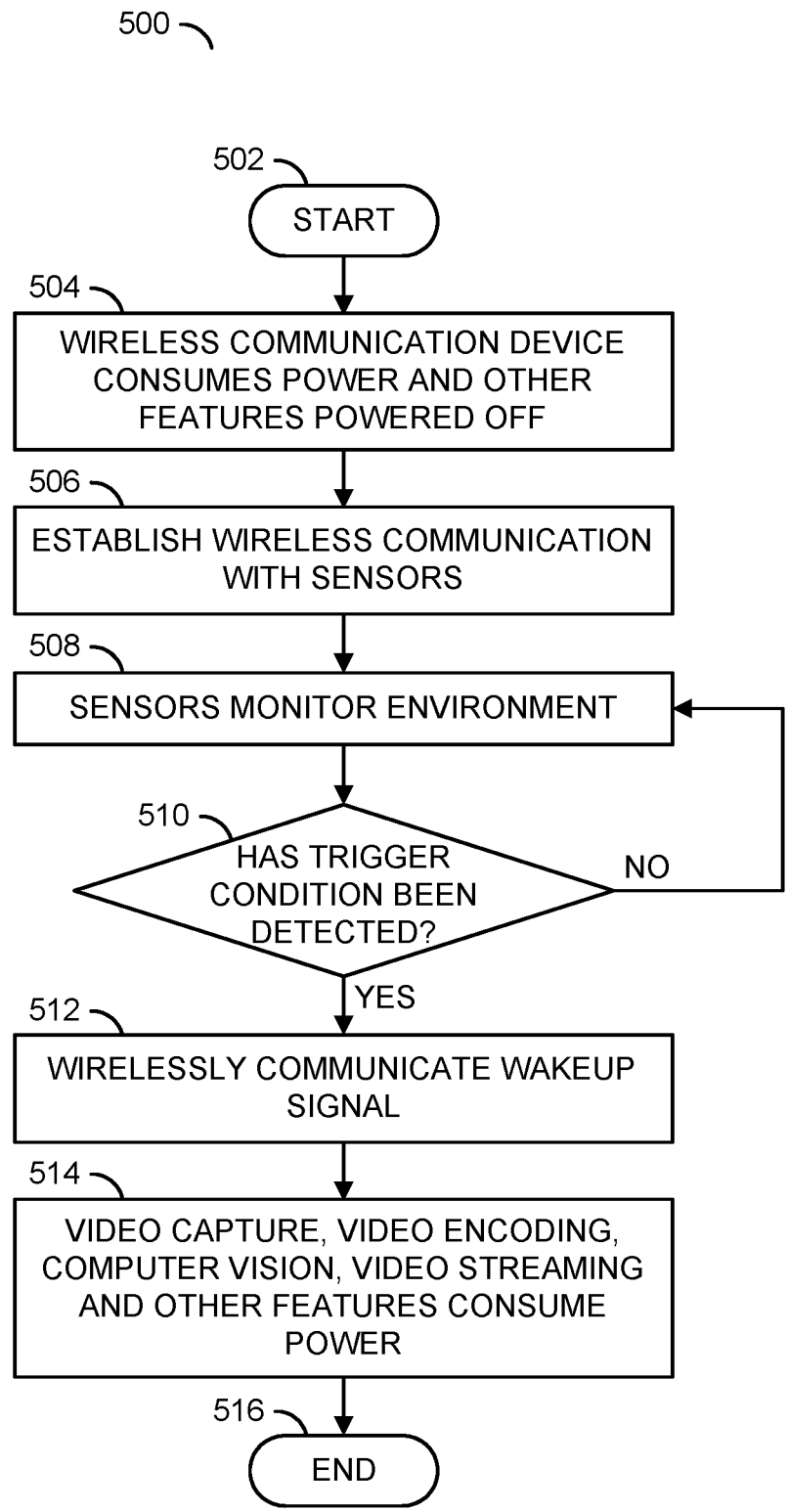
FIG. 11 is a flow diagram illustrating a method for activating a car security camera using wireless sensors.

Referring to FIG. 11, a method (or process) 500 is shown. The method 500 may activate a car security camera using wireless sensors. The method 500 generally comprises a step (or state) 502, a step (or state) 504, a step (or state) 506, a step (or state) 508, a decision step (or state) 510, a step (or state) 512, a step (or state) 514, and a step (or state) 516.

The step 502 may start the method 500. In the step 504, the wireless communication devices 120a-120n of the capture devices 102a-102n may consume power from the battery 42 and other features of the capture devices 102a-102n may be powered off (or operate in a sleep or low-powered mode of operation to limit the draw from the battery 42). Next, in the step 506, the wireless communication devices 120a-120n may establish wireless communication with the sensors 104a-104n. For example, the wireless communication devices 120a-120n of the capture devices 102a-102n may connect with the wireless communication devices 122a-122n of the sensors 104a-104n (e.g., a direct wireless connection). In the step 508, the sensors 104a-104n may monitor the environment (e.g., generate sensor data). Next, the method 500 may move to the decision step 510.

In the decision step 510, the sensors 104a-104n may determine whether a trigger condition has been detected. If the trigger condition has not been detected, then the method 500 may return to the step 508. If the trigger condition has been detected, then the method 500 may move to the step 512. In the step 512, the wireless communication devices 122a-122n of the sensors 104a-104n may wirelessly communicate the wakeup signals WAKE_A-WAKE_N. Next, in the step 514, the processor 160 of the capture devices 102a-102n may activate the video capture mode of operation in response to the wireless communication devices 120a-120n receiving the wakeup signals WAKE_A-WAKE_N. For example, video capture, video encoding, computer vision operations, video streaming and/or other features may consume power from the battery 42. Next, the method 500 may move to the step 516. The step 516 may end the method 500.

Figure 12:
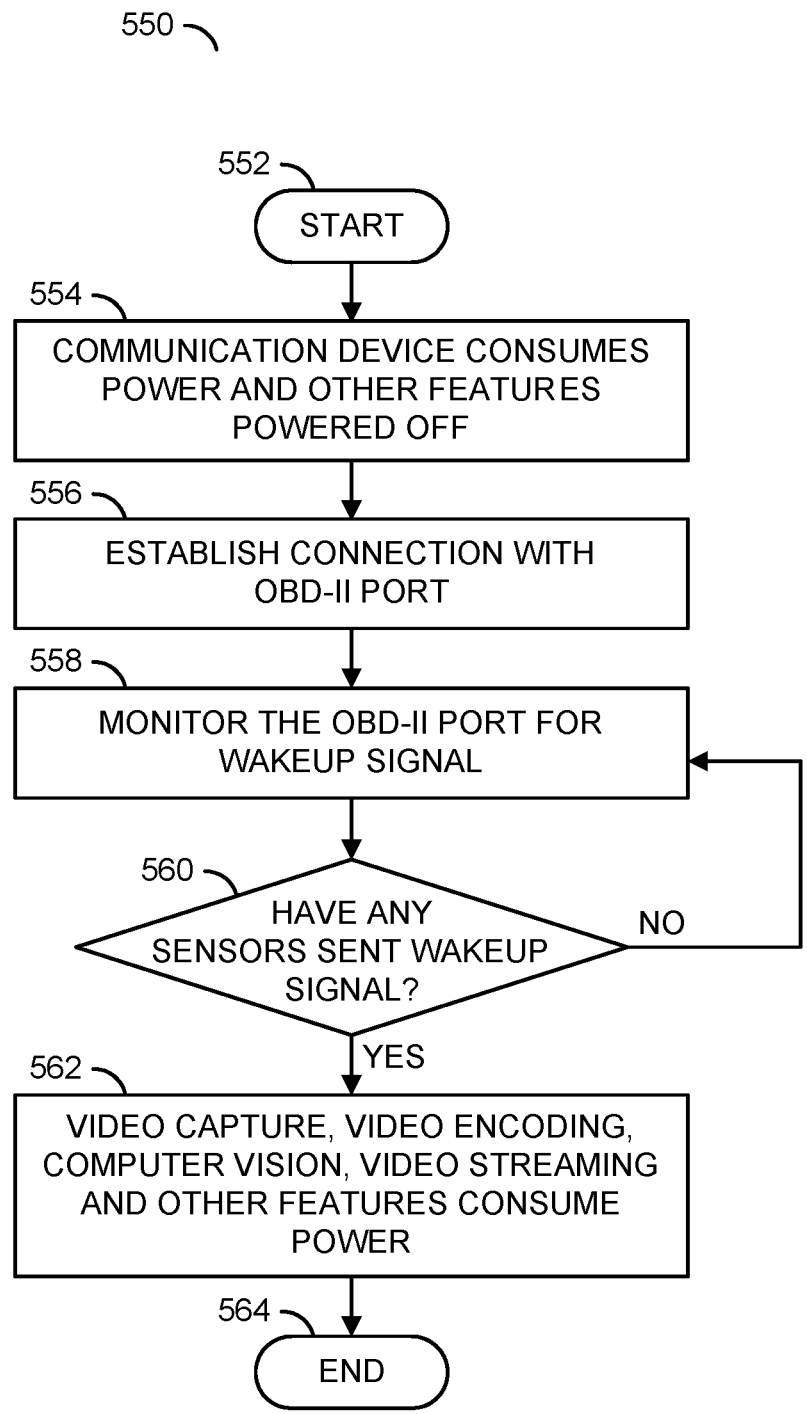
FIG. 12 is a flow diagram illustrating a method for activating a car security camera using a vehicle port.

Referring to FIG. 12, a method (or process) 550 is shown. The method 550 may activate a car security camera using a vehicle port. The method 550 generally comprises a step (or state) 552, a step (or state) 554, a step (or state) 556, a step (or state) 558, a decision step (or state) 560, a step (or state) 562, and a step (or state) 564.

The step 552 may start the method 550. In the step 554, the wired communication devices 120a-120n of the capture devices 102a-102n may consume power from the battery 42 and other features of the capture devices 102a-102n may be powered off (or operate in a sleep or low-powered mode of operation to limit the draw from the battery 42). Next, in the step 556, the communication devices 120a-120n may establish a connection with the interface 40 (e.g., the OBD-II port of the vehicle 50). In the step 558, the processor 160 of the capture devices 102a-102n may monitor the OBD-II port for one or more of the wakeup signals WAKE_A-WAKE_N. For example, the communication devices 122a-122n of the sensors 104a-104n may also be connected to the OBD-II port and may present the wakeup signals WAKE_A-WAKE_N when a triggering event is detected. When the wakeup signals WAKE_A-WAKE_N are present on the OBD-II port, the capture devices 102a-102n may receive the wakeup signals. Next, the method 550 may move to the decision step 560.

In the decision step 560, capture devices 102a-102n may determine whether any of the sensors 104a-104n have sent at least one of the wakeup signals WAKE_A-WAKE_N. If no wakeup signal has been detected, then the method 550 may return to the step 558. If a wakeup signal has been detected, then the method 550 may move to the step 562. In the step 562, the capture devices 102a-102n may activate the video capture mode of operation in response to the wakeup signals WAKE_A-WAKE_N being present on the OBD-II port. For example, video capture, video encoding, computer vision operations, video streaming and/or other features may consume power from the battery 42. Next, the method 550 may move to the step 564. The step 564 may end the method 550.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a capture device configured to (i) operate in a standby mode of operation until a wakeup signal is received and (ii) operate in video capture mode of operation in response to said wakeup signal; and
   one or more sensors each configured to (i) detect a trigger condition and (ii) communicate said wakeup signal in response to detecting said trigger condition, wherein
      (a) said capture device is configured to consume a first amount of power in said standby mode of operation and a second amount of power in said video capture mode of operation,
      (b) said first amount of power is less than said second amount of power,
      (c) said capture device is configured to generate pixel data in said video capture mode of operation,
      (d) each of said sensors are (i) remotely located on a vehicle with respect to said capture device and (ii) configured to connect to an OBD-II port of said vehicle, and
      (e) said wakeup signal is communicated to said capture device over said OBD-II port.

2. The apparatus according to claim 1, wherein (i) each of said sensors comprise a wireless communication device and (ii) said wireless communication device is configured to wirelessly communicate said wakeup signal to said capture device.

3. The apparatus according to claim 2, wherein said wireless communication device is configured to wirelessly communicate using a low power radio frequency communication protocol.

4. The apparatus according to claim 3, wherein said low power radio frequency communication protocol comprises at least one of Bluetooth, sub-1 GHz, or ZigBee.

5. The apparatus according to claim 1, wherein one or more of said sensors comprise a passive infrared sensor, an ultra-sound sensor, a radar sensor, and a smart motion sensor.

6. The apparatus according to claim 1, wherein one or more of said sensors are located on an exterior of said vehicle or mounted to a front windshield of said vehicle.

7. The apparatus according to claim 1, wherein said capture device and said sensors are each powered by a battery of said vehicle.

8. The apparatus according to claim 1, wherein said sensors are configured to detect a person approaching said vehicle and said wakeup signal is configured to activate said video capture mode of operation to enable said capture device to generate said pixel data comprising said person approaching said vehicle.

9. The apparatus according to claim 8, wherein said person approaching said vehicle is detected before said person makes physical contact with said vehicle.

10. The apparatus according to claim 1, wherein said capture device comprises a circuit configured to (a) encode video data in response to video frames generated from said pixel data and (b) establish wireless connectivity.

11. The apparatus according to claim 10, wherein said wireless connectivity comprises at least one of LTE communication and Wi-Fi communication.

12. The apparatus according to claim 10, wherein said circuit is further configured to (i) perform computer vision operations on said video frames, (ii) detect objects in response to said computer vision operations, (iii) determine characteristics of said objects and (iv) determine a behavior of said objects based on said characteristics.

13. The apparatus according to claim 12, wherein said circuit is further configured to upload said video frames to a remote device in response to said behavior determined from said objects.

14. The apparatus according to claim 12, wherein said circuit is further configured to wirelessly communicate a notification to a remote device in response to said behavior determined from said objects.

15. The apparatus according to claim 1, wherein (i) said capture device is configured to communicate said pixel data to a processor and (ii) said processor is configured to (a) generate video frames in response to said pixel data, (b) encode said video frames and (c) perform computer vision operations on said video frames.

16. The apparatus according to claim 15, wherein said processor is implemented as an embedded device in said vehicle.

17. The apparatus according to claim 15, wherein said processor is implemented as part of a cloud computing service.

18. The apparatus according to claim 1, wherein said capture device is located in said vehicle and captures said pixel data through a windshield of said vehicle.

19. An apparatus comprising:
- a capture device configured to (i) operate in a standby mode of operation until a wakeup signal is received and (ii) operate in video capture mode of operation in response to said wakeup signal; and
- one or more sensors each configured to (i) detect a trigger condition and (ii) communicate said wakeup signal in response to detecting said trigger condition, wherein
  - (a) said capture device is configured to generate pixel data in said video capture mode of operation,
  - (b) each of said sensors are (i) remotely located on a vehicle with respect to said capture device and (ii) configured to connect to an OBD-II port of said vehicle, and
  - (c) said wakeup signal is communicated to said capture device over said OBD-II port.

* * * * *